US 12,432,612 B2

(12) United States Patent
Lyu et al.

(10) Patent No.: US 12,432,612 B2
(45) Date of Patent: Sep. 30, 2025

(54) METHOD FOR TRANSMITTING BSR, TERMINAL DEVICE, AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/927,526

(22) Filed: Oct. 25, 2024

(65) Prior Publication Data

US 2025/0048175 A1 Feb. 6, 2025

Related U.S. Application Data

(63) Continuation of application No. PCT/CN2023/104483, filed on Jun. 30, 2023.

(51) Int. Cl.
*H04W 28/02* (2009.01)

(52) U.S. Cl.
CPC .............................. *H04W 28/0278* (2013.01)

(58) Field of Classification Search
None
See application file for complete search history.

(56) References Cited

U.S. PATENT DOCUMENTS

| | | | | |
|---|---|---|---|---|
| 2010/0284354 A1* | 11/2010 | Ostergaard | ............ | H04W 72/21 370/329 |
| 2011/0039568 A1* | 2/2011 | Zhang | .................... | H04W 52/50 455/452.1 |
| 2012/0314672 A1* | 12/2012 | Chen | ........................ | H04L 1/188 370/329 |
| 2016/0135155 A1* | 5/2016 | Al-Shalash | ........... | H04W 72/21 370/329 |
| 2020/0229212 A1* | 7/2020 | You | ...................... | H04W 72/044 |
| 2020/0344632 A1* | 10/2020 | Li | ...................... | H04W 28/0252 |
| 2022/0110145 A1* | 4/2022 | Kanamarlapudi | .... | H04L 1/1874 |
| 2024/0244478 A1* | 7/2024 | Kanamarlapudi | .... | H04L 1/0005 |
| 2024/0244479 A1* | 7/2024 | Kanamarlapudi | .......................... | H04W 28/0278 |
| 2024/0340690 A1* | 10/2024 | Yanakiev | .......... | H04W 28/0278 |

FOREIGN PATENT DOCUMENTS

| | | |
|---|---|---|
| CN | 108631918 A | 10/2018 |
| CN | 115868236 A | 3/2023 |
| CN | 116017727 A | 4/2023 |
| CN | 116097728 A | 5/2023 |

(Continued)

OTHER PUBLICATIONS

International Search Report and Written Opinion in International Appln. No. PCT/CN2023/104483, mailed on Dec. 22, 2023, 15 pages (with machine English translation).

(Continued)

*Primary Examiner* — Andre Tacdiran
(74) *Attorney, Agent, or Firm* — Fish & Richardson P.C.

(57) ABSTRACT

The present application provides a method for transmitting BSR, a terminal device, and a network device. One example method includes: triggering a first BSR by a terminal device, wherein the first BSR is triggered based on a preset service.

20 Claims, 7 Drawing Sheets

(56) References Cited

FOREIGN PATENT DOCUMENTS

| | | |
|---|---|---|
| CN | 116097729 A | 5/2023 |
| WO | WO 2019213924 A1 | 11/2019 |
| WO | WO 2020211097 A1 | 10/2020 |

OTHER PUBLICATIONS

Office Action in Chinese Appln. No. 202380010756.1, mailed on Mar. 7, 2025, 23 pages (with English translation).
Office Action in Chinese Appln. No. 202380010756.1, mailed on Jul. 4, 2025, 28 pages (with English translation).

* cited by examiner

METHOD FOR TRANSMITTING BSR, TERMINAL DEVICE, AND NETWORK DEVICE

CROSS-REFERENCE TO RELATED APPLICATIONS

This application is a continuation of International Application No. PCT/CN2023/104483, filed on Jun. 30, 2023, the disclosure of which is hereby incorporated by reference in its entirety.

TECHNICAL FIELD

The present application relates to the technical field of communication, and more specifically, to a method for transmitting BSR, a terminal device, and a network device.

BACKGROUND

In some communication systems, such as new radio (NR) systems, a terminal device can send a buffer state report (BSR) to a network device for the network device to perform data transmission scheduling based on the BSR sent by terminal device.

For some services with a large data volume, such as extended reality (XR) services, a data frame may be divided into multiple data packets for transmission. For this type of services, the BSR transmission mechanism in related technologies may lead to delayed data transmission scheduling, resulting in significant transmission latency for the services.

SUMMARY

The present application provides a method for transmitting BSR, a terminal device, and a network device. Various aspects involved in the present application are introduced in the following.

According to a first aspect of the present application, there is provided a method for transmitting BSR. The method includes: triggering a first BSR by a terminal device, wherein the first BSR is triggered based on a preset service.

According to a second aspect of the present application, there is provided a method for transmitting BSR. The method includes: receiving, by a network device, a first BSR sent by a terminal device, wherein the first BSR is triggered based on a preset service.

According to a third aspect of the present application, there is provided a terminal device. The terminal device includes: a trigger module, configured to trigger a first BSR, wherein the first BSR is triggered based on a preset service.

According to a fourth aspect of the present application, there is provided a network device. The network device includes: a receiving module, configured to receive a first BSR sent by a terminal device, where the first BSR is triggered based on a preset service.

According to a fifth aspect of the present application, there is provided a terminal device. The terminal device includes a processor and a memory, where the memory is configured to store one or more computer programs, and the processor is configured to call the computer programs in the memory to cause the terminal device to perform some or all of the steps of the method according to the first aspect.

According to a sixth aspect of the present application, there is provided a network device. The network device includes a processor, a memory, and a communication interface, where the memory is configured to store one or more computer programs, and the processor is configured to call the computer programs in the memory to cause the network device to perform some or all of the steps of the method according to the second aspect.

According to a seventh aspect of the present application, embodiments of the present application provide a communication system comprising the terminal device and/or the network device mentioned above. In another possible design, the system may also include other devices that interact with the terminal device or the network device as provided in the embodiments of the present application.

According to an eighth aspect of the present application, the embodiments of the present application provide a computer-readable storage medium storing a computer program that causes a computer to perform some or all of the steps of the method according to the above aspects.

According to a ninth aspect of the present application, the embodiments of the present application provide a computer program product, where the computer program product includes a non-transitory computer-readable storage medium storing a computer program, and the computer program is executable to cause a computer to perform some or all of the steps of the method according to the above aspects. In some implementations, the computer program product may be a software installation package.

According to a tenth aspect of the present application, the embodiments of the present application provide a computer program, where the computer program is executable to cause a computer to perform some or all of the steps of the method according to the above aspects.

According to an eleventh aspect of the present application, the embodiments of the present application provide a chip comprising a memory and a processor, where the processor is configured to call a computer program from the memory and execute the computer program to implement some or all of the steps of the method according to the above aspects.

In the embodiments of the present application, the terminal device may trigger a first BSR based on a preset service. In this way, when it is required to transmit data of the preset service, the status of buffered data of the preset service can be reported to the network device through the first BSR corresponding to the preset service, which is conducive to ensuring more timely and accurate data transmission scheduling of the preset service.

DETAILED DESCRIPTION OF THE EMBODIMENTS

The technical solutions in the embodiments of the present application are described below in conjunction with the accompanying drawings in the embodiments of the present application.

Communication System Architecture

Figure 1:
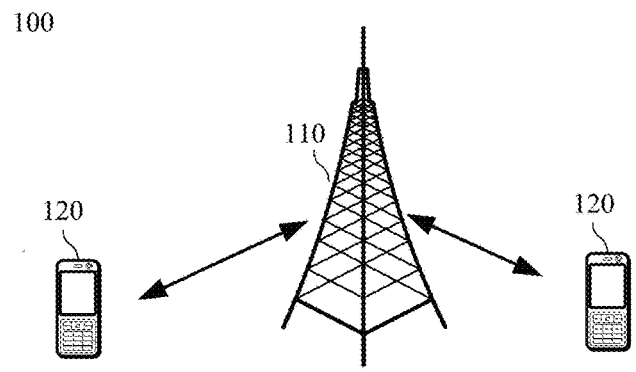
FIG. 1 is a schematic diagram of a system architecture in which a wireless communication system of the embodiments of the present application can be applied.

FIG. 1 is a schematic diagram of a system architecture in which a wireless communication system 100 of the embodiments of the present application can be applied. The wireless communication system 100 may include a network device 110 and a terminal device 120. The network device 110 may be a device that communicates with the terminal device 120. The network device 110 can provide communication coverage for specific geographic areas and can communicate with the terminal device 120 located within this coverage area.

FIG. 1 illustrates one network device and two terminal devices by way of example. Optionally, the wireless communication system 100 may include multiple network devices and each network device's coverage area may include other numbers of terminal devices, which is not limited by the embodiments of the present application.

Optionally, the wireless communication system 100 may also include other network entities, such as network controllers and mobility management entities, which is not limited by the embodiments of the present application.

It should be understood that the technical solution of the embodiments of the present application can be applied to various communication systems, such as: the fifth generation (5G) system or new radio (NR), long term evolution (LTE) system, LTE frequency division duplex (FDD) system, LTE time division duplex (TDD), etc. The technical solution provided in the present application can also be applied to future communication systems, such as the sixth-generation mobile communication system, satellite communication system, and so on.

The terminal device in the embodiments of the present application may also be referred to as user equipment (UE), access terminal, user unit, user station, mobile platform, mobile station (MS), mobile terminal (MT), remote station, remote terminal, mobile device, user terminal, terminal, wireless communication device, user agent or user device. The terminal device in the embodiments of the present application may refer to a device that provides voice and/or data connectivity to users, and can be configured to communicate people, objects, and machines, such as handheld devices and vehicle mounted devices with wireless connection functions. The terminal device in the embodiments of the present application may be mobile phones, tablets, laptops, palmtop computers, mobile internet devices (MID), wearable devices, virtual reality (VR) devices, augmented reality (AR) devices, wireless terminals in industrial control, wireless terminals in self-driving, wireless terminals in remote medical surgery, wireless terminals in smart grid, wireless terminals in transportation safety, wireless terminals in smart city, wireless terminals in smart home, etc. Optionally, UE can be configured to act as a base station. For example, UE can act as a scheduling entity that provides sidelink signals between UEs in V2X or D2D, etc. For example, cellular phones and automobiles can communicate with each other using sidelink signals. Cellular phones can communicate with smart home devices without the need to relay communication signals through the base station.

The network device in the embodiments of the present application may be a device configured for communication with the terminal device. The network device may also be referred to as an access network device or a radio access network device. For example, the network device may be a base station. The network device in the embodiments of the present application may refer to a radio access network (RAN) node (or device) that connects a terminal device to a wireless network. The base station may broadly cover or be replaced with the following various names, such as: NodeB, evolved NodeB (eNB), next generation NodeB (gNB), relay station, access point, transmitting and receiving point (TRP), transmitting point (TP), master eNB (MeNB), secondary eNB (SeNB), multi-standard radio (MSR) node, home base station, network controller, access node, wireless node, access point (AP), transmission node, transceiver node, base band unit (BBU), remote radio unit (RRU), active antenna unit (AAU), remote radio head (RRH), central unit (CU), distributed unit (DU), positioning node, etc. The base station may be a macro base station, a micro base station, a relay node, a donor node, or the like, or a combination thereof. The base station may also refer to a communication module, modem, or chip configured to be installed within the aforementioned equipment or devices. The base station may also be a device that performs base station functions in mobile switching centers, device-to-device (D2D) communication, vehicle-to-everything (V2X) communication, machine-to-machine (M2M) communication, a network side device in 6G network, and a device that performs base station functions in future communication systems. The base station can support networks of the same or different access technologies. The embodiments of the present application impose no limitation on the specific technology and device form adopted by the network device.

The base station may be fixed or mobile. For example, a helicopters or drone can be configured to act as a mobile base station, and one or more cells can move according to the location of the mobile base station. In other examples, a helicopter or drone can be configured as a device for communication with another base station.

In some deployments, the network device in the embodiments of the present application may refer to CU or DU, or the network device includes CU and DU. gNB may also include AAU.

The network device and the terminal device can be deployed on land, including indoor or outdoor, handheld or vehicle mounted; can also be deployed on the water surface; and can also be deployed on airplanes, balloons, and satellites in the air. The embodiments of the present embodiment impose no limitation on the scenarios in which the network device and the terminal device are located.

It should be understood that all or part of the functions of the communication devices in the present application can also be implemented through software functions running on hardware, or through virtualization functions instantiated on platforms (such as cloud platforms).

XR Service

XR may refers to, for example, the combination of real and virtual environments generated by computer technology and wearable devices and human-computer interaction. XR service may include but are not limited to the following representative forms: augmented reality (AR), mixed reality (MR), virtual reality (VR), etc. In some embodiments, XR service may also include cloud gaming.

In order to improve the user experience of interacting with the virtual world, XR service has strict requirements for bandwidth and latency. For example, XR service requires larger bandwidth and smaller latency. Generally, XR service can generate data frames (or service frames) periodically at a certain frame rate. Due to the encoding characteristics of XR video data, such as randomness of intra frame and inter frame encoding, as well as randomness of video content changes, the data frame size of XR service generally varies significantly. In addition, the data volume of XR service is generally large, which may result in the data of one data frame of XR service being divided into multiple data packets for transmission.

With the continuous development of wireless cellular communication technology, especially the development of 5G technology, the spectrum efficiency is getting higher and higher, the available frequency band is getting wider, and the data transmission rate is getting higher and higher. Therefore, using cellular communication technology to support big data services (such as XR service) is gradually becoming feasible. Taking XR service as an example, the XR and 5G network develop to mutually promote and jointly advance in a positive direction. Generally, one user's XR service requires a transmission rate of 30-200 Mbps, and XR services of at least 10 terminal devices should be supported simultaneously in a small cell. 5G network can provide such a large transmission capacity. In addition, compared to previous wireless networks, the transmission capacity provided by 5G cellular network has greatly increased. Existing mainstream services cannot fully occupy the network capacity of 5G network, resulting in vacant network transmission capabilities. Objectively, a new service is also needed to fully utilize 5G network and promote the rapid growth and development of 5G network.

In most scenarios of actual network deployment, due to the weaker capabilities of terminal devices compared to network devices, the network performance of the upstream may have a greater impact on the communication system. Therefore, network enhancement of the upstream is particularly important. Taking 5G network and XR service as examples, compared to downlink XR services, the existing 5G networks need to particularly enhance their support for upstream XR services. This is because the upstream transmission capacity of wireless network is generally smaller than the downlink transmission capacity, and the data rate of XR service is much greater than other types of services. If the data of XR service is still transmitted in the existing way, it cannot meet the transmission requirements of XR service. Therefore, utilizing 5G network to transmit upstream XR services, especially video services, has become a key focus of network enhancement.

The main application scenarios of XR service include live video streaming. The camera in the live broadcast room generates video data which is transmitted to the base station through the upstream channel of the 5G cellular network, and then transmitted to the live broadcast server through the core network gateway, and then transmitted to the live audience by the live broadcast server. The process of data transmission in live video streaming scenarios is described below with reference to FIG. 2.

Figure 2:
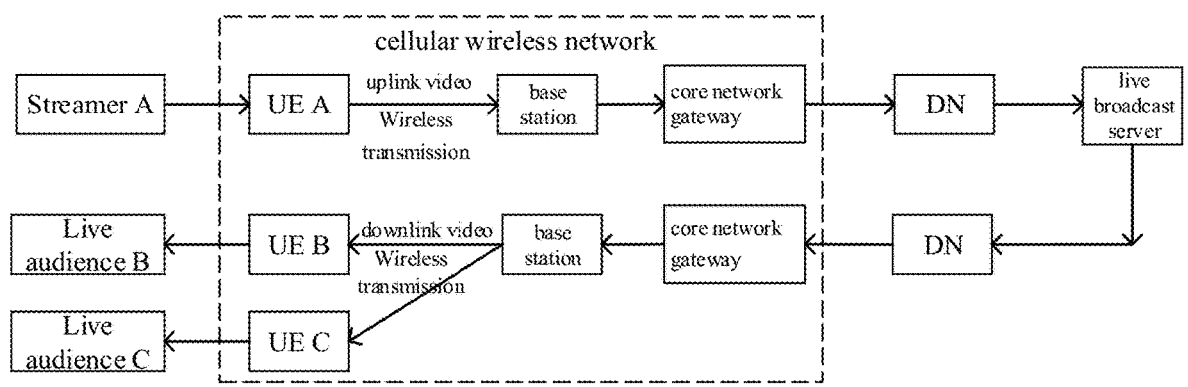
FIG. 2 is a schematic diagram of data transmission process in a live video streaming scenario.

In the example shown in FIG. 2, streamer A, live audience B, and live audience C are all connected through wireless networks. The part within the dashed box in FIG. 2 belongs to the cellular wireless network, while the part outside the dashed box belongs to the application layer or external data network. The cellular wireless network within the dashed box may be a 5G network, a 4G network, a future 6G network, etc., which is not limited by the embodiments of the present application. In FIG. 2, data can be transmitted between the UE and the base station through a wireless channel, while data can be transmitted between other devices through a wired channel. From the transmission process in FIG. 2, it can be seen that the wireless channel is the weak point of the entire transmission channel. The above transmission process involves the transmission at two sites through the wireless channel: that is, UE A transmits upstream video data to the base station through the wireless channel, and UE B and UE C receive downlink video data from the base station through the wireless channel.

BSR Table

In an existing communication system, the upstream radio resources used by UE to transmit upstream data are allocated by the base station. When UE needs to send data, it can send BSR to the base station. BSR can be used for indicating an amount of data to be transmitted by the UE. For example, BSR can indicate to the base station that the UE has some number of bytes of upstream data that needs to be transmitted. The base station can allocate upstream resources to the UE based on the BSR sent by the UE. UE can send upstream data to the base station based on the upstream resources allocated by the base station.

In relevant protocols, BSR is generated by the UE's medium access control (MAC) entity, or in other words, BSR is a MAC control element (CE). The MAC CE can be a 5-bit or 8-bit value, with each codepoint (or index value) representing a volume interval (volume range) of data to be transmitted.

Table 1 shows the correspondence between BSR index and data volume interval using a 5-bit value as an example. The table shown in Table 1 may also be referred to as BSR table.

TABLE 1

| codepoint (index) | BS value |
| --- | --- |
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |

TABLE 1-continued

| codepoint (index) | BS value |
|---|---|
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

It can be seen from Table 1 that the size of the data volume interval represented by each codepoint varies. The smaller the absolute value of the data volume, the smaller the extension of the data volume interval corresponding to a codepoint, that is, the more accurate the data volume reported in BSR. On the contrary, the greater the absolute value of the data volume, the larger the extension of the data volume interval corresponding to a codepoint, that is, the rougher the data volume reported in BSR. For example, when the codepoint is 4, the corresponding data volume interval is 21-28 bytes, and when the codepoint is 27, the corresponding data volume interval is 39819-55474 bytes. This design takes into account that when the data volume is very small, the base station can allocate upstream radio resources to the UE once to transmit all data of the reported data volume. Accurate data volume can avoid the base station allocating too many resources; while when the data volume is large, the base station is likely to allocate upstream radio resources to the UE multiple times, and the UE may report BSR again in subsequent transmission, so there is no problem of waste of radio resources, and there is no need for BSR to report the accurate data volume.

After the introduction of XR service, the mainstream transmission data is video data. The data volume of video data is very large. Depending on resolution, the data volume of each video frame may reach up to 10000-30000 bytes. If UE reports XR data through BSR, the accuracy of the report according to Table 1 is very rough. In addition, the transmission of data of one video frame of XR service needs to be finished within 3-5 ms, which occupies a large amount of radio resources. The base station needs to allocate corresponding resources to the UE for the UE to transmit the video frame data within 3-5 ms, during which the UE generally does not report BSR again.

In order to ensure that the terminal device has sufficient radio resources to transmit XR service, as an implementation method, the base station can allocate upstream radio resources according to the upper limit of the data volume reported in BSR (according to the upper limit of data volume or the maximum data volume corresponding to the codepoint). Taking Table 1 as an example, when the codepoint reported in BSR is 22, the base station allocates 10570 bytes of upstream radio resources to the terminal device, but the actual upstream data volume of the terminal device may only be 8000 bytes, resulting in a waste of 2570 bytes of upstream radio resources. In addition, since XR service requires a large amount of radio resources, the consequence of wasting radio resources mentioned above become even more serious in such case.

Based on this, the 3rdgenerationpartnershipproject generation partnership project (3GPP) has decided to introduce a new BSR table, similar to the one shown in Table 1. UE can report BSR according to the new table. The new BSR table can be specified by protocols. In this new BSR table, codepoints can be used for corresponding to main data volume intervals of video services.

In some embodiments, after finishing the data transmission of a current video frame, the terminal device may also indicate to the base station that the data transmission of the current video frame has been finished. As a possible implementation, the terminal device may report BSR=0 to the base station, implicitly indicating that the data transmission of the current video frame has been finished.

As mentioned above, the terminal device can send BSR to the network device to request upstream resources, so that the network device can perform data transmission scheduling according to the BSR sent by the terminal device. However, for some services with a large data volume (such as XR services), the data frame of the service may be divided into multiple data packets for transmission. For this type of services, the existing BSR transmission mechanism may lead to delayed data transmission scheduling, resulting in significant transmission latency for the services. Such issue is introduced in the following in conjunction with FIG. 3.

Figure 3:
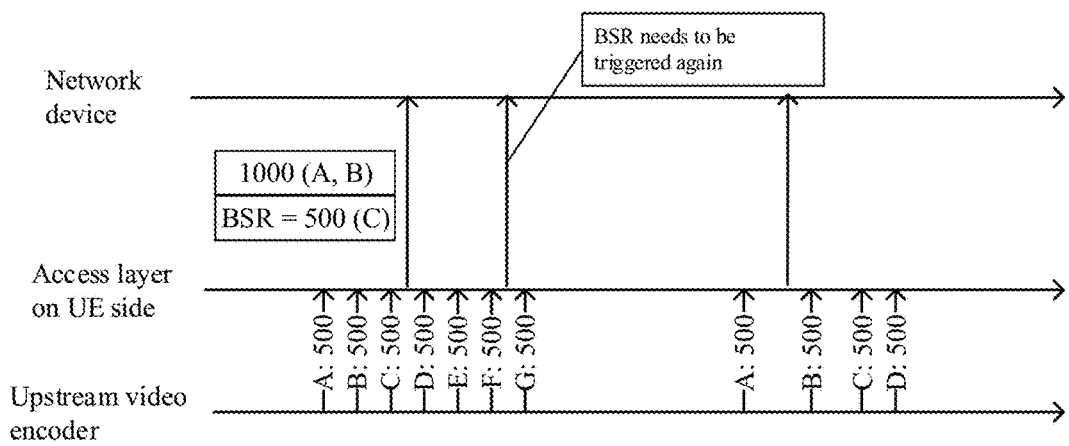
FIG. 3 is a schematic diagram of the data transmission process.

Since different encoders may use different processing methods, the data of an upstream data frame (such as a video frame) may arrive at the UE access layer in succession or at the same time. FIG. 3 takes an example of the data of an upstream data frame arriving at the UE access layer in succession for introduction.

In the case that the data of an upstream data frame arrives at the UE access layer in succession, when the terminal device sends BSR, only a part of the data of the data frame may just arrive the UE access layer. So, when the remaining data of the data frame subsequently arrives at the UE access layer, according to the existing protocol, no more BSR is triggered again, resulting in a large data transmission latency. As shown in FIG. 3, the terminal device firstly transmits data A and data B and reports BSR=500 at the same time. At this time, only data C is waiting to be transmitted in the buffer of the UE access layer, and data D, E, F, and G have not yet arrived at the UE access layer. When subsequent data D, E, F, and G arrive, BSR needs to be triggered again to reduce data transmission latency.

Regarding the above issues, the embodiments of the present application provide a method for transmitting BSR, a terminal device, and a network device, so that when it is required to transmit data of the preset service, the status of buffered data of preset service can be reported to the network device through the first BSR corresponding to the preset service, which is conducive to ensuring more timely and accurate data transmission of the preset service. Embodiments of the method of the present application are introduced below in conjunction with the accompanying drawings.

Figure 4:
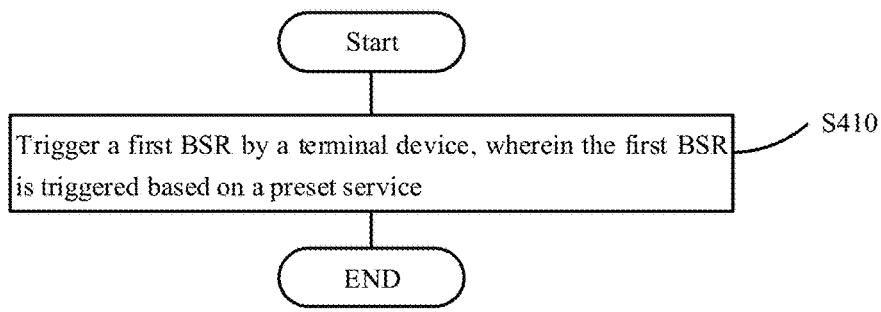
FIG. 4 is a flowchart of a method for transmitting BSR provided in an embodiment of the present application.

FIG. 4 is a flowchart of a method for transmitting BSR provided in an embodiment of the present application. The method shown in FIG. 4 is executable by a terminal device, such as the terminal device 120 shown in FIG. 1. The method shown in FIG. 4 may include step S410 as introduced below.

In step S410, the terminal device triggers a first BSR. The first BSR is triggered based on a preset service.

In some embodiments, the preset service may refer to a predetermined type of service. For example, the preset service may include XR service. As an example, the preset service may be VR service, AR service, cloud gaming, etc.

In some embodiments, the preset service may refer to a service with predetermined characteristics. The embodiments of the present application impose no specific limitation on the predetermined characteristics of the preset service. For example, the preset service may refer to a service with a large data volume; or, the preset service may refer to a service of which the data frame is divided into multiple data packets for transmission; or, the preset service may refer to a service of which the data burst is divided into multiple data packets for transmission. In addition to the listed predetermined characteristics, the preset service may also refer to services that have high transmission latency requirements (strong instantaneity), services with urgent scheduling requirements, and services with high transmission priority.

In other words, the characteristics of the preset service can include multiple types, which may be characteristics of service type, such as the preset service being XR service; or, the characteristics may be characteristics related to service properties, such as a data burst of the preset service including multiple data packets, a data frame of the preset service including multiple data packets, etc.

It should be noted that in some embodiments, the terms "data burst" and "data frame" mentioned in the embodiments of the present application can be replaced with each other.

In some embodiments, the first BSR being triggered based on the preset service may refer to that the terminal device may trigger the first BSR when detecting that there exists data of the preset service that needs to be transmitted.

In some embodiments, the terminal device detecting that there exists data of the preset service that needs to be transmitted may include one or more of the following: the terminal device detecting that there exists data of the preset service in an access layer that needs to be transmitted; the terminal device detecting that there exists data of the preset service in a logical channel (LCH) that needs to be transmitted, for example, the terminal device detecting that there exists data of the preset service in one or more LCHs that needs to be transmitted; the terminal device detecting that there exists data of the preset service in a logical channel group (LCG) that needs to be transmitted, for example, the terminal device detecting that there exists data of the preset service in one or more LCGs that needs to be transmitted; and the terminal device detecting that there exists data of the preset service in a quality of service (QoS) flow that needs to be transmitted, for example, the terminal device detecting that there exists data of the preset service in one or more QoS flows that needs to be transmitted.

In some embodiments, the first BSR being triggered based on the preset service may refer to the triggering of the first BSR being related (coupled) to the preset service.

The embodiments of the present application impose no specific limitation on the type of the first BSR. For example, the first BSR may be a regular BSR, so that when a triggering condition of the first BSR is met, the terminal device can timely send the first BSR to obtain resources for transmitting the preset service faster, thereby reducing transmission latency. However, the embodiments of the present application are not limited thereto. In some embodiments, the first BSR may also be other types of BSR in addition to the regular BSR. For example, the first BSR may be a periodic BSR, or a new BSR introduced for a preset service in subsequent transmission.

In some embodiments, the first BSR can be understood as a BSR for the preset service. For example, as long as the terminal device detects that there exists data of a preset service that needs to be transmitted, it can trigger the first BSR for the preset service.

In the embodiments of the present application, the terminal device can trigger the first BSR based on a preset service (such as XR service). In this way, when it is required to transmit data of the preset service, the status of buffered data of the preset service can be reported to the network device through the first BSR corresponding to the preset service, which is conducive to ensuring more timely and accurate data transmission scheduling of the preset service.

As mentioned above, the triggering of the first BSR is related to the preset service. The triggering of the first BSR is introduced in detail below.

In some embodiments, the triggering of the first BSR being related to the preset service may include: the triggering condition of the first BSR being related to the preset service. For example, the triggering condition of the first BSR may be associated with one or more of the following types of information: a data packet of the preset service obtained by UE; transmission latency requirements of the preset service; and one or more upstream scheduling-free resources configured for the UE.

In some embodiments, the data packet of the preset service obtained by the UE may refer to a data packet of the preset service obtained by the UE access layer, or a data packet of the preset service obtained by the UE buffer, or the data packet of the preset service in the QoS flow/LCH/LCG of the UE.

In some embodiments, the transmission latency requirements of the preset service may include the transmission latency requirements corresponding to one data frame of the preset service, such as the transmission latency requirements corresponding to a current data frame of the preset service.

In some embodiments, the upstream scheduling-free resources configured for the UE refer to configured grant (CG) resources configured for the UE, such as CG resources configured for the UE by the network device.

In some embodiments, the triggering condition of the first BSR may include one or more of the following: UE learning that data of the preset service is about to arrive; a data packet of the preset service arriving at the UE access layer; one or more upstream scheduling-free resources configured for the UE being insufficient for finishing the data transmission of the preset service; one or more upstream scheduling-free resources configured for the UE being sufficient for finishing the data transmission of the preset service; one or more upstream scheduling-free resources configured for the UE being insufficient for finishing the data transmission of the preset service within a transmission pre-estimated latency of the preset service; and one or more upstream scheduling-free resources configured for the UE being sufficient for finishing the data transmission of the preset service within a transmission pre-estimated latency of the preset service. These triggering conditions are exemplarily descried in the following.

In some embodiments, as long as the UE learns that data of the preset service is about to arrive, the UE can trigger the first BSR. For example, if the UE learns that data of the first data frame is about to arrive before the data of the first data frame of the preset service actually arrives at the UE access layer, it can trigger the first BSR in advance. For a detailed introduction on UE triggering the first BSR in advance, reference can be made to the following description.

In some embodiments, as long as a data packet of the preset service arrives at the UE access layer, the UE can trigger the first BSR, regardless of whether there exists data not yet transmitted in the current QoS flow/LCH/LCG/buffer of the UE. That is to say, in a case that there still exists data not yet transmitted in the current QoS flow/LCH/LCG/buffer of the UE, the UE can trigger the first BSR as long as a data packet of the preset service arrives at the UE access layer. Or, in a case that there exists no data to be transmitted in the current QoS flow/LCH/LCG/buffer of the UE, the UE can trigger the first BSR as long as a data packet of the preset service arrives at the UE access layer. The current related protocol specifies that when new data arrives in an LCG, if there still exists data in the buffer of the UE not yet transmitted, the BSR will not be triggered; and if there exists no data to be transmitted in the buffer of the UE, the BSR is triggered. Compared with the scheme of the protocol, the embodiments of the present application can timely schedule upstream radio resources for the preset service, which is conducive to ensuring more timely data transmission of the preset service.

The embodiments of the present application impose no limitation on the implementation method of the preset service arriving at the UE access layer. In some embodiments, the data of the preset service may arrive at the UE access layer in succession. In this case, the preset service arriving at the UE access layer may refer to the first data packet of a data burst of the preset service arriving at the UE access layer, that is, the first BSR can be triggered when the first data packet of a data burst of the preset service arrives at the UE access layer; or, the preset service arriving at the UE access layer may refer to the first packet of a data frame (such as a video frame) of the preset service arriving at the UE access layer, that is, the first BSR can be triggered when the first packet of a data frame of the preset service arrives at the UE access layer. However, the embodiments of the present application are not limited thereto. For example, when the first few data packets (such as the first 3, the first 5, etc.) of a data burst or a data frame of the preset service arrive at the UE access layer, the first BSR can be triggered. Alternatively, when all data packets of a data burst or a data frame of the preset service arrive at the UE access layer, the first BSR can be triggered. In some embodiments, the data of a data burst or a video frame of the preset service may arrive at the UE access layer simultaneously (or all at once). In this case, the preset service arriving at the UE access layer may refer to all data packets of a data burst or a data frame of the preset service arriving at the UE access layer, or of course, it may also refer to the first data packet of a data burst or a data frame of the preset service arriving at the UE access layer.

In some embodiments, whether one or more upstream scheduling-free resources configured for the UE are sufficient for finishing the data transmission of the preset service refers to whether one or more upstream scheduling-free resources configured for the UE are sufficient for finishing the data transmission of all preset services in the buffer of the UE. Taking the preset service being XR service as an example, whether one or more upstream scheduling-free resources configured for the UE are sufficient for finishing the data transmission of the preset service refers to whether one or more upstream scheduling-free resources configured for the UE are sufficient for finishing the data transmission of all XR services in the buffer of the UE.

In some embodiments, whether one or more upstream scheduling-free resources configured for the UE are sufficient for finishing the data transmission of the preset service refers to whether one or more upstream scheduling-free resources configured for the UE are sufficient for finishing the data transmission of a data burst or a data frame of the preset service in the buffer of the UE. Taking the preset service being XR service as an example again, whether one or more upstream scheduling-free resources configured for the UE are sufficient for finishing the data transmission of the preset service refers to whether one or more upstream scheduling-free resources configured for the UE are sufficient for finishing the transmission of a data burst or a data frame of the XR service in the buffer of the UE.

It should be noted that the embodiments of the present application impose no limitation on the buffer of the UE. For example, the buffer of the UE may refer to the buffer in the LCG of the UE; or, the buffer of the UE may refer to the buffer in the LCH of the UE; or, the buffer of the UE may refer to the buffer in the QoS flow of the UE; or, the buffer of the UE may refer to the buffer in the UE access layer. The concept of the buffer mentioned later can be replaced with the concepts listed here.

In some embodiments, if one or more upstream scheduling-free resources configured for the UE are sufficient for finishing the data transmission of the preset service, the UE does not trigger the first BSR. In some embodiments, if one or more upstream scheduling-free resources configured for the UE are sufficient for finishing the data transmission of the preset service within a transmission pre-estimated latency of a data burst or a video frame of the preset service, the UE may not trigger the first BSR.

However, the embodiments of the present application are not limited thereto. In some embodiments, if one or more upstream scheduling-free resources configured for the UE are sufficient for finishing the data transmission of the preset service, the UE may also trigger the first BSR. For example, in the case where one or more upstream scheduling-free resources configured for the UE are sufficient for finishing the data transmission of the preset service, the first BSR triggered by the UE may indicate the remaining data volume of the current data frame of the preset service, excluding the data volume that can be transmitted by the upstream scheduling-free resources, where the remaining data volume may be a negative value. In some embodiments, if one or more upstream scheduling-free resources configured for the UE are sufficient for finishing the data transmission of the preset service within a transmission pre-estimated latency of a data burst or a video frame of the preset service, the UE may also trigger the first BSR. For example, in the case where one or more upstream scheduling-free resources configured for the UE are sufficient for finishing the data transmission of the preset service within a transmission pre-estimated latency of a data burst or a video frame of the preset service, the first BSR triggered by the UE may indicate the remaining data volume of the current data frame of the preset service, excluding the data volume that can be transmitted by the upstream scheduling-free resources, where the remaining data volume may be a negative value.

Figure 5:
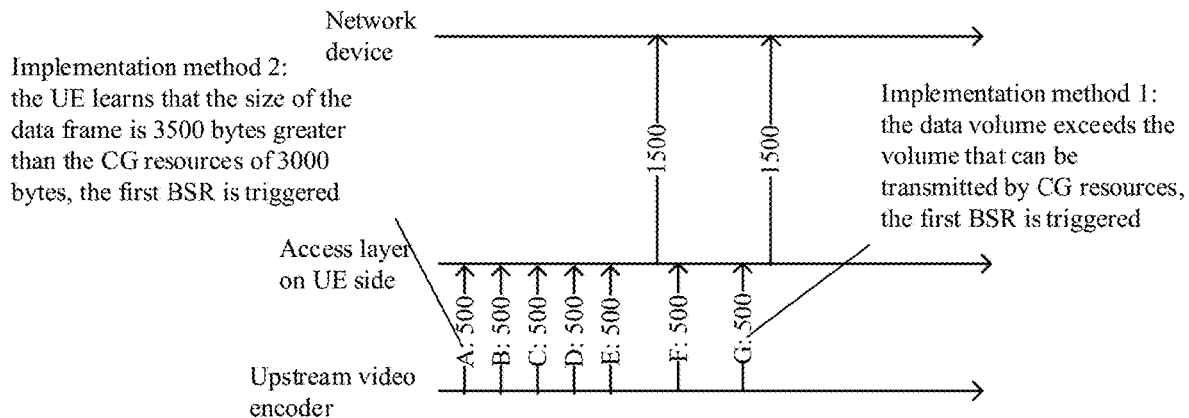
FIG. 5 is a schematic diagram of an implementation method for triggering the first BSR provided in the embodiments of the present application.

In the case where one or more upstream scheduling-free resources configured for the UE are insufficient for finishing the data transmission of the preset service, for example, in the case where one or more upstream scheduling-free resources configured for the UE are insufficient for finishing the data transmission of the preset service within a transmission pre-estimated latency of the preset service, the embodiments of the present application impose no specific limitation on how to trigger the first BSR. Two implementation methods of triggering the first BSR are given below as an example in conjunction with FIG. 5.

Implementation method 1: When the data volume to be transmitted of the current data frame of the preset service exceeds the remaining transmission capacity of one or more upstream scheduling-free resources configured for the UE, the UE triggers the first BSR. Taking FIG. 5 as an example, assuming that one or more upstream scheduling-free resources pre-configured for the UE are 3000 bytes, when data packet A/B/C/D/E/F arrives, the first BSR is not triggered because the data volume to be transmitted of the current data frame of the preset service at this time has not yet exceeded the remaining transmission capacity of the one or more upstream scheduling-free resources configured for the UE; while when data packet G arrives, the UE triggers the first BSR because the data volume to be transmitted of the current data frame of the preset service exceeds the remaining transmission capacity of the one or more upstream scheduling-free resources configured for the UE.

Implementation method 2: When the first data packet of the preset service arrives at the UE access layer, the UE triggers the first BSR. That is to say, in the case where the UE can learn the size of a data burst or a data frame of the preset service, when the first data packet of the data burst or the data frame arrives at the UE access layer, the UE can compare the size of the data burst or the data frame with the size of one or more upstream scheduling-free resources configured for the UE to determine whether to timely trigger the first BSR. It should be noted that the UE can learn the size of a data burst or a data frame for the preset service when the first data packet arrives, or before the first data packet arrives. Taking FIG. 5 as an example, assuming that the upstream scheduling-free resources pre-configured for the UE are 3000 bytes, when the first data packet (data packet A) of a data burst or a data frame of the preset service arrives at the UE access layer, the UE learns that the size of the data burst or the data frame is 3500 bytes. As the size of the data burst or the data frame exceeds the data volume that can be transmitted by one or more upstream scheduling-free resources configured for the UE, the UE triggers the first BSR when data packet A arrives at the UE access layer.

In some cases, after the first BSR is triggered, the UE can generate and send (report) the first BSR. In some cases, after the first BSR is triggered, the UE can also cancel the first BSR in subsequent transmission. The generation/transmission of the first BSR and the cancellation of the first BSR are respectively described below.

Figure 6:
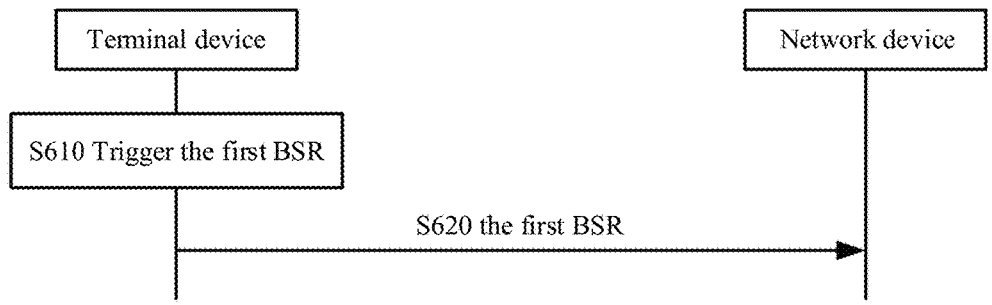
FIG. 6 is a flowchart of a method for transmitting BSR provided in another embodiment of the present application.

FIG. 6 is a flowchart of a method for transmitting BSR provided in another embodiment of the present application. FIG. 6 illustrates the method from the perspective of interaction between UE and network device, where the UE and the network device may, for example, be the UE 120 and the network device 110 in FIG. 1, respectively. The method shown in FIG. 6 includes step S610 and step S620.

In step S610, the UE triggers the first BSR. The first BSR is triggered based on a preset service (such as XR service).

For a detailed description of step S610, reference can be made to the description of step S410 in the previous text. For the sake of conciseness, it will not be repeated here.

In step S620, the UE sends the first BSR to the network device.

In some embodiments, after the first BSR is triggered, if there are upstream radio resources (hereinafter referred to as resources), the UE can use the resources to send the first BSR to the network device.

In some embodiments, the resources for sending the first BSR may be allocated for the preset service, for example, the resources for sending the first BSR may be allocated for XR service. Or in other words, after the first BSR is triggered, if there are resources allocated for the preset service, the UE can use these resources to send the first BSR.

In some embodiments, if the resources for sending the first BSR are allocated for the preset service, the first BSR sent by the UE may include one or more of the following: the to-be-transmitted data volume associated with the preset service; all the to-be-transmitted data volume in the buffer of the UE; the data volume to be transmitted of a first target service, where the first target service may be a service (or service data) that is configured by the network device and can be indicated by the first BSR, or in other words, the first target service may be a service that can be associated with the first BSR configured by the network device.

As an example, if the resources for sending the first BSR are allocated for a preset service, the first BSR sent by the UE may only include the to-be-transmitted data volume associated with the preset service. Taking the preset service being XR service as an example, if the resources for sending the first BSR are allocated for XR service, the UE can only report the data volume to be transmitted of the XR service.

As another example, if the resources for sending the first BSR are allocated for a preset service, the first BSR sent by the UE may include all the to-be-transmitted data volume in the buffer of the UE. Taking the preset service being XR service as an example, if the resources for sending the first BSR are allocated for XR service, the UE can report all the current data volume to be transmitted (including the data volume to be transmitted of the XR service and non XR services).

As another example, if the resources for sending the first BSR are allocated for a preset service, the first BSR sent by the UE may include the data volume to be transmitted of the first target service. That is to say, the network devices can configure the first BSR to indicate the to-be-transmitted data volume of which service. The embodiments of the present application impose no limitation on the way in which the network device configures the first target service. For example, the network device can configure the first target service via high layer signaling (such as RRC signaling), or the network device can configure the first target service via MAC CE.

In some embodiments, after the first BSR is triggered, there may be upstream radio resources on the UE side, but these resources are not allocated for the preset service, but are for sending a second BSR. In this case, the UE can use these resources to send a second BSR.

In some embodiments, the second BSR sent by the UE may include one or more of the following: the data volume to be transmitted of the services other than the preset service in the buffer of the UE; all the to-be-transmitted data volume in the buffer of the UE; and the data volume to be transmitted of a second target service, where the second target service may be a service (or service data) that can be indicated by the second BSR configured by the network device, or in other words, the second target service may be a service that can be associated with the second BSR configured by the network device.

In some embodiments, if the resources for sending the second BSR are not allocated for the preset service, the second BSR sent by the UE may not include (or indicate) the to-be-transmitted data volume associated with the preset service. Taking the preset service being XR service as an example, if the resources for sending the second BSR are not allocated for XR service, the second BSR sent by the UE may not include (or indicate) the to-be-transmitted data volume associated with the XR service.

In some embodiments, in the case where the second BSR does not include (or indicate) the to-be-transmitted data volume associated with the preset service, the second BSR may only include (or indicate) the to-be-transmitted data volume associated with the services other than the preset service.

As an example, if the resources for sending the second BSR are not allocated for the preset service, the second BSR sent by the UE may only include the to-be-transmitted data volume associated with the services other than the preset service. Taking the preset service being XR service as an example, if the resources for sending the second BSR are not allocated for XR service, the UE can only report the data volume to be transmitted of non XR services.

As another example, if the resources for sending the second BSR are not allocated for the preset service, the second BSR sent by the UE may include all the to-be-transmitted data volume in the buffer of the UE. Taking the preset service being XR service as an example, if the resources for sending the second BSR are not allocated for XR service, the UE can report all the current data volume to be transmitted (including the data volume to be transmitted of the XR service and non XR services).

As another example, if the resources for sending the second BSR are not allocated for the preset service, the second BSR sent by the UE may include the data volume to be transmitted of the second target service. That is to say, the network devices can configure the second BSR to indicate the to-be-transmitted data volume of which service. For example, the network device can configure the second BSR to send the to-be-transmitted data volume of the XR service. The embodiments of the present application impose no limitation on the way in which the network device configures the second target service. For example, the network device can configure the second target service via high layer signaling (such as RRC signaling), or the network device can configure the second target service via MAC CE.

In some embodiments, if the second BSR does not include the to-be-transmitted data volume associated with the preset service, the first BSR may not be cancelled. That is to say, if the second BSR does not report the to-be-transmitted data volume associated with the preset service, the first BSR triggered by the preset service is not cancelled. Taking the preset service being XR service as an example, if the second BSR does not report the to-be-transmitted data volume associated with the XR service, the first BSR triggered by the XR service is not cancelled.

In some embodiments, if the second BSR does not include the to-be-transmitted data volume associated with the preset service, the first BSR may be cancelled. That is to say, if the second BSR reports the to-be-transmitted data volume associated with the preset service, the first BSR triggered by the preset service is cancelled. Taking the preset service being XR service as an example, if the second BSR reports the to-be-transmitted data volume associated with the XR service, the first BSR triggered by the XR service is cancelled.

In some embodiments, no matter whether the second BSR includes the to-be-transmitted data volume associated with the preset service or not, the first BSR is not cancelled. That is to say, no matter whether the second BSR reports the to-be-transmitted data volume associated with the preset service or not, the first BSR triggered by the preset service is not cancelled. For example, in the case where the second BSR reports the to-be-transmitted data volume associated with the preset service, the first BSR is not cancelled.

In some embodiments, the implementation of whether to cancel the first BSR after the UE sends the second BSR is configured by the network device. For example, the network device may configure not to cancel the first BSR if the second BSR does not report the to-be-transmitted data volume associated with the preset service; and to cancel the first BSR if the second BSR reports the to-be-transmitted data volume associated with the preset service; or, the network device may configure to not cancel the first BSR regardless of whether the second BSR reports the to-be-transmitted data volume associated with the preset service. However, the embodiments of the present application are not limited thereto. The implementation of whether to cancel the first BSR after the UE sends the second BSR may also be pre-defined or pre-configured, or be determined based on the implementation of the UE.

In the embodiments of the present application, the to-be-transmitted data volume associated with the preset service may include multiple types. For example, the to-be-transmitted data volume associated with the preset service may include one or more of the following: the to-be-transmitted data volume of a data burst or a data frame of a preset service; the to-be-transmitted data volume of a current preset service in the buffer of the UE; and the to-be-transmitted data volume of all preset services in the buffer of the UE.

The to-be-transmitted data volume of a data burst or a data frame of a preset service may include, for example, the to-be-transmitted data volume of a current data burst or a current data frame of the preset service.

It should be noted that in some embodiments, the "current data frame" mentioned in the embodiments of the present application can be understood as the data frame which is being transmitted in the buffer of the UE when the first BSR is triggered. Or in other words, the "current data frame" mentioned in the embodiments of the present application can be understood as the data frame that needs to be transmitted first after the first BSR is triggered.

It should also be noted that in some embodiments, the "current preset service" mentioned in the embodiments of the present application can be understood as the preset service corresponding to the "current data frame" (the current data frame is the data frame of the current preset service). Or in other words, the "current preset service" mentioned in the embodiments of the present application can be understood as the preset service which is being transmitted in the buffer of the UE (or the preset service corresponding to the data frame which is being transmitted) when the first BSR is triggered. In other words, the "current preset service" mentioned in the embodiments of the present application can be understood as the preset service (or data of the preset service) that needs to be transmitted first after the first BSR is triggered.

It should be understood that the above description of "current data frame" and/or "current preset service" can apply to any "current data frame" and/or "current preset service" mentioned later in this paper.

In some embodiments, there may exist multiple preset services in the buffer of the UE, such as multiple XR services. In this case, in some embodiments, the to-be-transmitted data volume associated with the preset service may refer to the to-be-transmitted data volume of one or some of the multiple preset services, such as the to-betransmitted data volume of the current preset service in the buffer of the UE (such as the to-be-transmitted data volume of the current XR service in the buffer of the UE). In some embodiments, the to-be-transmitted data volume associated with the preset service may refer to the to-be-transmitted data volume of all of the multiple preset services, such as the to-be-transmitted data volume of all the preset services in the buffer of the UE (such as the to-be-transmitted data volume of all XR services in the buffer of the UE).

In some embodiments, the transmission and/or cancellation of the first BSR is conditional. For example, the transmission and/or cancellation of the first BSR may be determined according to a first condition, where the first condition may be related to the resources obtained by the UE for transmitting the preset service. The first condition is introduced in detail below.

In some embodiments, the first condition may be related to the resources obtained by the UE for transmitting the preset service and the to-be-transmitted data volume associated with the preset service. For example, the UE can compare the size of the resources obtained for transmitting the preset service with the size of the to-be-transmitted data volume associated with the preset service. If the resources used for transmitting the preset service are large enough (for example, sufficient to transmit the to-be-transmitted data associated with the preset service, or greater than a certain limit/threshold), the UE can cancel the triggered first BSR and not send the first BSR. Otherwise, the UE can generate and send the first BSR.

In some embodiments, the first condition may include one or more of the following: whether the resources obtained by the UE for transmitting the preset service can finish the transmission of the current data frame of the preset service; whether the resources obtained by the UE for transmitting the preset service can finish the transmission of all to-be-transmitted data of the current preset service in the buffer of the UE; whether the resources obtained by the UE for transmitting the preset service can finish the transmission of the to-be-transmitted data of all the preset services in the buffer of the UE; and whether the resources obtained by the UE for transmitting the preset service can finish the transmission of all the to-be-transmitted data in the buffer of the UE.

For example, if the resources obtained by the UE for transmitting the preset service can finish the transmission of the current data frame of the preset service, the UE can cancel the triggered first BSR; while if the resources obtained by the UE for transmitting the preset service cannot finish the transmission of the current data frame of the preset service, the UE can generate and send the first BSR.

For another example, if the resources obtained by the UE for transmitting the preset service can finish the transmission of all to-be-transmitted data of the current preset service in the buffer of the UE, the UE can cancel the triggered first BSR; while if the resources obtained by the UE for transmitting the preset service cannot finish the transmission of all to-be-transmitted data of the current preset service in the buffer of the UE, the UE can generate and send the first BSR.

For another example, if the resources obtained by the UE for transmitting the preset service can finish the transmission of the to-be-transmitted data of all the preset services in the buffer of the UE, the UE can cancel the triggered first BSR; while if the resources obtained by the UE for transmitting the preset service cannot finish the transmission of the to-be-transmitted data of all the preset services in the buffer of the UE, the UE can generate and send the first BSR.

For another example, if the resources obtained by the UE for transmitting the preset service can finish the transmission of all the to-be-transmitted data in the buffer of the UE, the UE can cancel the triggered first BSR; while if the resources obtained by the UE for transmitting the preset service cannot finish the transmission of all the to-be-transmitted data in the buffer of the UE, the UE can generate and send the first BSR.

In some embodiments, the UE adopting which cancellation condition of BSR (for example, which first condition(s) to be adopted) may be pre-defined or pre-configured, for example, it may be predefined in a protocol; it may be configured by the network device, for example, it may be configured by the network device via high layer signaling.

In some embodiments, the UE adopting which cancellation condition of BSR is configured by the network device, which may be configured per LCH or per LCG.

In some embodiments, if it is required to send the first BSR, for example, when the condition for canceling the first BSR is not met and it is required to send the first BSR, the information included in the first BSR may be related to one or more of the following: the to-be-transmitted data volume associated with the preset service; all the to-be-transmitted data volume in the buffer of the UE; the already-transmitted data volume associated with the preset service; the remaining data volume in the buffer of the UE, excluding the data volume that can be transmitted by the upstream scheduling-free resources. Or in other words, when it is required to send the first BSR, the statistical method of the first BSR is related to one or more of the following: the to-be-transmitted data volume associated with the preset service; all the to-be-transmitted data volume in the buffer of the UE; the already-transmitted data volume associated with the preset service; the remaining data volume in the buffer of the UE, excluding the data volume that can be transmitted by the upstream scheduling-free resources.

For example, the information included in the first BSR is related to the to-be-transmitted data volume associated with the preset service. For example, the first BSR includes the to-be-transmitted data volume of the current data frame of the preset service. For another example, the first BSR includes all the data volume to be transmitted of the current preset service. For yet another example, the first BSR includes the to-be-transmitted data volume of all the preset services.

Alternatively, the information included in the first BSR is related to the to-be-transmitted data volume associated with the preset service and the already-transmitted data volume associated with the preset service. For example, the first BSR includes a total data volume of the current data frame of the preset service (including already-transmitted and to-be-transmitted data volume). For another example, the first BSR includes a total data volume of the current preset service (including already-transmitted and to-be-transmitted data volume). For yet another example, the first BSR includes a total data volume of all preset services (including already-transmitted and to-be-transmitted data volume).

In some embodiments, the total to-be-transmitted data volume in the buffer of the UE may include the to-be-transmitted data volume of all services (including the preset service and services other than preset service) in the buffer of the UE. Taking the preset service being XR service as an example, all the to-be-transmitted data volume in the buffer of the UE may include the to-be-transmitted data volume of the XR service and the to-be-transmitted data volume of non XR services in the buffer of the UE.

In some embodiments, the remaining data volume in the buffer of the UE excluding the data volume that can be transmitted by the upstream scheduling-free resources may refer to the remaining data volume, excluding the data volume that can be transmitted by the upstream scheduling-free resources, in the to-be-transmitted data volume associated with the preset service in the buffer of the UE. For example, the remaining data volume in the buffer of the UE excluding the data volume that can be transmitted by the upstream scheduling-free resources may refer to the remaining data volume, excluding the data volume that can be transmitted by the upstream scheduling-free resources, in the to-be-transmitted data volume of the current data frame of the preset service. Alternatively, the remaining data volume in the buffer of the UE excluding the data volume that can be transmitted by the upstream scheduling-free resources may refer to the remaining data volume, excluding the data volume that can be transmitted by the upstream scheduling-free resources, in the to-be-transmitted data volume of all the preset services in the buffer of the UE. However, the embodiments of the present application are not limited thereto. For example, the remaining data volume in the buffer of the UE excluding the data volume that can be transmitted by the upstream scheduling-free resources may refer to the remaining data volume, excluding the data volume that can be transmitted by the upstream scheduling-free resources, in the to-be-transmitted data volume of all services (including the preset service and services other than preset service) in the buffer of the UE.

In some embodiments, the remaining data volume in the buffer of the UE excluding the data volume that can be transmitted by the upstream scheduling-free resources may be a negative value. For example, in the case where the data volume that can be transmitted by the upstream scheduling-free resources is 1000 bytes and there exists a data volume of 800 bytes of the preset service in the buffer of the UE, the remaining data volume indicated by the first BSR can be represented as −200 bytes. Such approach is beneficial for the network device to clearly know the to-be-transmitted data volume of the UE, thereby enabling the network device to know the time when the UE enters a power-saving state.

In some embodiments, if it is required to send the first BSR, for example, when the condition for canceling the first BSR is not met and it is required to send the first BSR, the information included in the first BSR may include one or more of the following: the to-be-transmitted data volume of a current data frame of the preset service; the to-be-transmitted data volume of a current preset service in the buffer of the UE; the to-be-transmitted data volume of all preset services in the buffer of the UE; all the to-be-transmitted data volume in the buffer of the UE; the total data volume of the current data frame of the preset service; and the remaining data volume, excluding the data volume that can be transmitted by the upstream scheduling-free resources, in the current data frame of the preset service.

In some embodiments, the first BSR sent by the UE including which information or the UE adopting which statistical method of BSR may be pre-defined or pre-configured, for example, it may be predefined in a protocol; it may be configured by the network device, for example, it may be configured by the network device via high layer signaling.

In some embodiments, the first BSR sent by the UE including which information or the UE adopting which statistical method of BSR is configured by the network device, which may be configured per LCH or per LCG.

Figure 7:
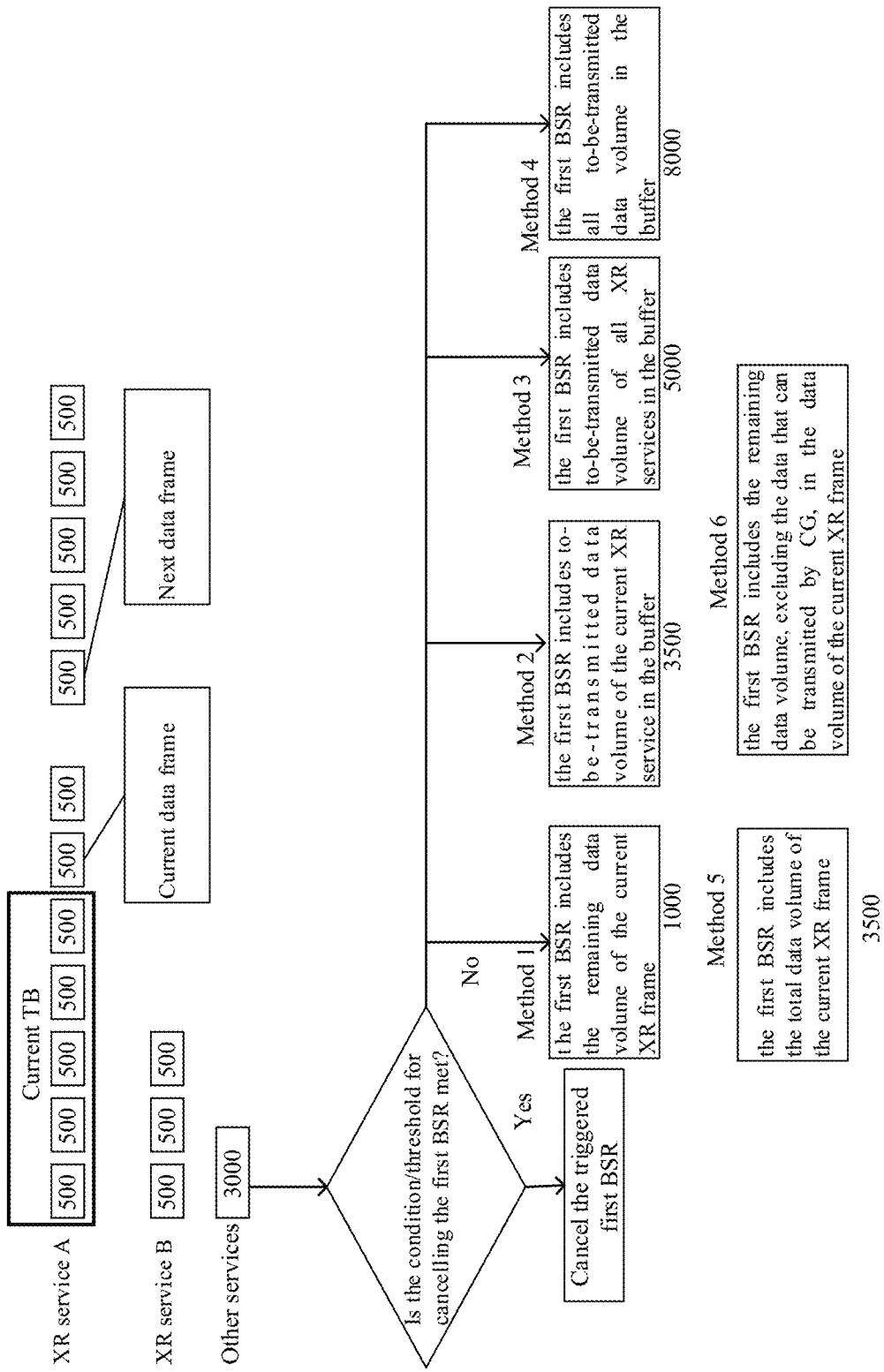
FIG. 7 is a flowchart of sending/canceling the first BSR provided in the embodiments of the present application.

The following gives an example, with reference to FIG. 7, of determining the transmission and/or cancellation of the first BSR based on the first condition, as well as the information contained in the first BSR when transmitting the first BSR. The preset service in this example may be, for example, XR service.

As shown in FIG. 7, after obtaining resources for transmitting the preset service, the UE can compare the size of the obtained resources with the to-be-transmitted data in the buffer according to the logic shown in FIG. 7, to determine whether to cancel the first BSR or send the first BSR. For example, if the obtained resources are large enough to meet the threshold for canceling BSR (such as the first condition mentioned above), the UE can cancel the first BSR and not send the first BSR. Otherwise, the UE can send the first BSR.

In some embodiments, the threshold for canceling BSR may include one or more of the following: the resources obtained by the UE for transmitting the preset service can transmit the current data frame of the preset service (as shown in FIG. 7, the current data frame requires 3500 bytes for transmission); the resources obtained by the UE for transmitting the preset service can transmit all the to-be-transmitted data of the current preset service (as shown in FIG. 7, all the to-be-transmitted data of the current preset service requires 6000 bytes for transmission); the resources obtained by the UE for transmitting the preset service can transmit the to-be-transmitted data of all preset services in the UE (as shown in FIG. 7, the to-be-transmitted data of all preset services in the UE requires 7500 bytes for transmission); and the resources obtained by the UE for transmitting the preset service can transmit all the to-be-transmitted data in the UE (as shown in FIG. 7, all the to-be-transmitted data in the UE requires 10500 bytes for transmission).

In some embodiments, in the case where the condition for canceling the first BSR is not met and it is required to send the first BSR, the information contained in the first BSR (or in other words, the statistical method of the first BSR) may be diverse, such as one or more of the six different types of information listed in FIG. 7. Specifically, the information contained in the first BSR may include one or more of the following: the to-be-transmitted data volume of the current data frame of the preset service (as shown in FIG. 7, requiring 1000 bytes); the to-be-transmitted data volume of the current preset service in the buffer of the UE (as shown in FIG. 7, requiring 3500 bytes); the to-be-transmitted data volume of all preset services in the buffer of the UE (as shown in FIG. 7, requiring 5000 bytes); all the to-be-transmitted data volume in the buffer of the UE (as shown in FIG. 7, requiring 8000 bytes); the total data volume of the current data frame of the preset service (as shown in FIG. 7, requiring 3500 bytes); and the remaining data volume, excluding the data volume that can be transmitted by the upstream scheduling-free resources, in the current data frame of the preset service. Taking the data volume that can be transmitted by the upstream scheduling-free resources being 1500 bytes as an example, if there are 1000 bytes left to be transmitted in the current data frame of the preset service, the remaining data volume, excluding the data volume that can be transmitted by the upstream scheduling-free resources, in the current data frame of the preset service can be −500 bytes.

It should be noted that among the six different types of information listed in FIG. 7, the first four types count the to-be-transmitted data volume, not including the already-transmitted data. The fifth type counts the total data volume of the current preset service, including the already-transmitted and yet-to-be-transmitted data volume. The sixth type counts the data volume in the buffer minus the data volume that can be transmitted by the upstream scheduling-free resources, which only requires to report via the first BSR the data volume of the preset service that requires dynamic allocation of upstream resources.

In some embodiments, when using the fifth statistical method, the UE can also indicate to the network device the first data packet of the current data frame of the preset service, helping the network device to determine the last data packet of the current data frame of the preset service, so that when the transmission of the current data frame is finished, the UE enters the power-saving state, and the network device also knows the time when the UE enters the power-saving state, achieving consistency in behaviors of the UE and network device. The relevant introduction on how the UE indicates the first data packet of the current data frame of the preset service and how the UE enters the power-saving state can be found in the detailed introduction below, which is not elaborated here.

In some embodiments, when the UE generates or sends the first BSR, the buffer of the UE already stores all the data of the current data frame of the preset service. In this case, the UE can include one or more of the above-mentioned types of information in the first BSR, so that the network device can accurately know the relevant buffer status of the preset service. In some embodiments, if it is required to send the first BSR, the first BSR may further include the first indication information. The first indication information is used for indicating whether there exists any to-be-transmitted data associated with the preset service in subsequent transmission.

In some embodiments, in the case where the buffer of the UE does not store all the data of the current data frame of the preset service, the first BSR may include the first indication information. For example, in the scenario where the encoder on the UE side submits data packets in succession, multiple data packets of one data frame may arrive at the UE access layer one after another. In this case, when the UE generates BSR, the buffer may not have stored all the data of the current data frame, so the first BSR may include the first indication information. However, the embodiments of the present application are not limited thereto. For example, in the case where the buffer of the UE has already stored all the data of the current data frame of the preset service, the first BSR may also include the first indication information.

The first indication information is described below.

In some embodiments, the first indication information may include one or more of the following: whether there exists any to-be-transmitted data of the current data frame of the preset service in subsequent transmission; the to-be-transmitted data volume of the current data frame of the preset service in subsequent transmission; the time when the to-be-transmitted data of the current data frame of the preset service arrives at the UE access layer in subsequent transmission.

For example, the first indication information may include whether there still exists any to-be-transmitted data of the current data frame of the preset service in subsequent transmission. As an implementation method, the first indication information can indicate whether there still exists any to-be-transmitted data of the current data frame of the preset service in subsequent transmission through 1 bit. For example, when the first indication information is "0", it indicates that there exists no to-be-transmitted data of the current data frame in subsequent transmission, and when the first indication information is "1", it indicates that there still exists to-be-transmitted data of the current data frame in subsequent transmission. However, the embodiments of the present application are not limited thereto. For example, when the first indication information is "0", it indicates that there still exists to-be-transmitted data of the current data frame in subsequent transmission, and when the first indication information is "1", it indicates that there exists no to-be-transmitted data of the current data frame in subsequent transmission. This indication method is easy to implement and does not waste resources. As another implementation method, the first indication information can indicate whether there still exists any to-be-transmitted data of the current data frame of the preset service in subsequent transmission through multiple bits. For example, when the first indication information is "true", it indicates that there still exists to-be-transmitted data of the current data frame in subsequent transmission, and when the first indication information is "false", it indicates that there exists no to-be-transmitted data of the current data frame in subsequent transmission. Alternatively, when the first indication information is "there exists to-be-transmitted data of the current data frame in subsequent transmission", it indicates that there still exists to-be-transmitted data of the current data frame in subsequent transmission, and when the first indication information is "there exists no to-be-transmitted data of the current data frame in subsequent transmission", it indicates that there exists no to-be-transmitted data of the current data frame in subsequent transmission.

For another example, the first indication information may include the to-be-transmitted data volume of the current data frame of the preset service (or the to-be-transmitted data volume of the current data frame of the preset service in subsequent transmission). For example, the first indication information may be "there still exist 2000 bytes of data of the current data frame to be transmitted in subsequent transmission".

For yet another example, the first indication information may include a range of the to-be-transmitted data volume of the current data frame of the preset service (or a range of the to-be-transmitted data volume of the current data frame of the preset service in subsequent transmission). For example, in the case where the UE knows that there still exists data to be transmitted in subsequent transmission, but only knows that the data volume may be within a certain range, the UE can indicate the range of the to-be-transmitted data volume of the current data frame of the preset service through the first indication information.

The embodiments of the present application impose no specific limitation on the implementation method of the first indication information indicating the range of the to-be-transmitted data volume of the current data frame of the preset service. For example, the first indication information can indicate the minimum and maximum values of the range to indicate the range of the to-be-transmitted data volume. Taking UE knowing that the to-be-transmitted data volume in subsequent transmission is 500-550 bytes as an example, the first indication information can indicate that the minimum value of the range is 500 and the maximum value of the range is 550. Alternatively, the first indication information can indicate the minimum value and an extension of the range to indicate the range of the to-be-transmitted data volume. Still taking UE knowing that the to-be-transmitted data volume in subsequent transmission is 500-550 bytes as an example, the first indication information can indicate that the minimum value of the range is 500 and the extension of the range is 50. However, the embodiments of the present application are not limited thereto. For example, the first indication information can indicate the maximum value and an extension of the range to indicate the range of the to-be-transmitted data volume.

For yet another example, the first indication information may include the to-be-transmitted data volume of the current data frame of the preset service in subsequent transmission and the time when the to-be-transmitted data of the current data frame arrives at the UE access layer in subsequent transmission. For example, the first indication information may be "there still exist 2000 bytes of data of the current data frame to be transmitted in subsequent transmission, which will arrive at time T1".

In some embodiments, in the case where the buffer of the UE does not store all the data of the current data frame and the UE does not know the to-be-transmitted data volume of the current data frame, the first indication information may include whether there exists any to-be-transmitted data of the current data frame of the preset service in subsequent transmission. However, the embodiments of the present application are not limited thereto. For example, in some embodiments, in the case where the buffer of the UE does not store all the data of the current data frame but the UE knows the to-be-transmitted data volume of the current data frame, the first indication information may also include whether there exists any to-be-transmitted data of the current data frame of the preset service in subsequent transmission.

In some embodiments, in the case where the buffer of the UE does not store all the data of the current data frame but the UE knows the to-be-transmitted data volume of the current data frame, the first indication information may include the to-be-transmitted data volume of the current data frame of the preset service in subsequent transmission.

However, the embodiments of the present application are not limited thereto. In the case where the buffer of the UE does not store all the data of the current data frame but the UE knows the to-be-transmitted data volume of the current data frame, the first indication information may include various types of information. For example, the first indication information may include one or more of the following information: the to-be-transmitted data volume of the current data frame in the buffer of the UE; the to-be-transmitted data volume of the current data frame of the preset service (including the data that has already arrived at the buffer and the data that has not arrived at the buffer); whether there exists any to-be-transmitted data of the current data frame of the preset service in subsequent transmission; and the to-be-transmitted data volume of the current data frame of the preset service in subsequent transmission.

In some embodiments, in the case where the buffer of the UE does not store all the data of the current data frame but the UE knows the to-be-transmitted data volume of the current data frame, the UE needs to generate the first BSR and report the status of the subsequent data of the current data frame of the preset service regardless of whether the current upstream radio resources can finish the transmission of all the data of the current data frame of the preset service in the buffer of the UE.

For example, the first indication information may include one of the above types of information. For example, the first indication information may include the to-be-transmitted data volume of the current data frame in the buffer of the UE. Alternatively, the first indication information may include the to-be-transmitted data volume of the current data frame of the preset service (including the data that has already arrived at the buffer and the data that has not arrived at the buffer).

For another example, the first indication information may include multiple types of the above information. For example, the first indication information may include the to-be-transmitted data volume of the current data frame in the buffer of the UE and whether there exists any to-be-transmitted data of the current data frame of the preset service in subsequent transmission. Alternatively, the first indication information may include the to-be-transmitted data volume of the current data frame in the buffer of the UE and the to-be-transmitted data volume of the current data frame of the preset service in subsequent transmission.

In some embodiments, in the case where the UE knows the time when the to-be-transmitted data of the current data frame of the preset service arrives at the UE access layer in subsequent transmission, the first indication information may include the time (instant) when the to-be-transmitted data of the current data frame of the preset service arrives at the UE access layer in subsequent transmission.

In the embodiments of the present application, the first indication information can be used for indicating the time when any data packet in the current data frame of the preset service arrives at the UE access layer in subsequent transmission, and the present application is not limited thereto. For example, the first indication information may indicate the time when the first data packet in the current data frame arrives at the UE access layer in subsequent transmission, the time when the last data packet in the current data frame arrives at the UE access layer in subsequent transmission, or the time when an intermediate data packet in the current data frame arrives at the UE access layer in subsequent transmission, such as the time when half of the data volume arrives at the UE access layer in subsequent transmission.

Figure 8:
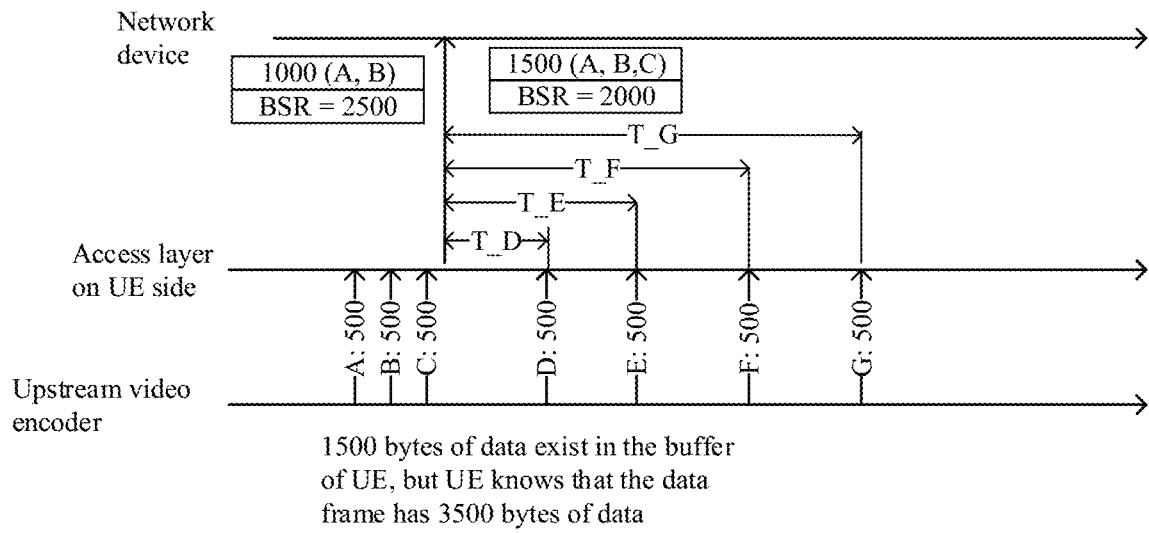
FIG. 8 is a schematic diagram of an indication method of first indication information provided in the embodiments of the present application.

For ease of understanding, an exemplary introduction of the first indication information is provided below in conjunction with FIG. 8. In the example of FIG. 8, when the UE generates/sends the first BSR, the buffer of the UE has not yet stored all the data of the current data frame of the preset service, but the UE knows the total data volume of the current data frame of the preset service.

In this case, the UE needs to generate the first BSR and report the status of the subsequent data of the current data frame of the preset service regardless of whether the current upstream radio resources can finish the transmission of all the data of the current data frame of the preset service in the buffer of the UE.

Referring to FIG. 8, when the UE generates the first BSR and reports it to the network device, there exist 1500 bytes of data of the preset service in the buffer of the UE, but the UE knows that the current data frame of the preset service has 3500 bytes.

Assuming that the upstream radio resources cannot transmit the 1500 bytes of data of the preset service in the buffer and only can transmit 1000 bytes, the first indication information contained in the first BSR generated by the UE may include one or more of the following four indication methods.

Indication method 1: the first indication information indicates the to-be-transmitted data volume of the current data frame in the buffer of the UE. For example, in the example of FIG. 8, the first indication information indicates that the to-be-transmitted data volume of the current data frame in the buffer of the UE is 500 bytes (1000 bytes can be transmitted via the existing upstream transmission resources without the need to apply for resources again).

Indication method 2: the first indication information indicates the to-be-transmitted data volume of the current data frame of the preset service (including the data that has already arrived at the buffer and the data that has not arrived at the buffer). For example, in the example of FIG. 8, the first indication information indicates that the to-be-transmitted data volume of the current data frame of the preset service is 2500 bytes.

Indication method 3: the first indication information indicates the to-be-transmitted data volume of the current data frame in the buffer of the UE and whether there exists any to-be-transmitted data of the current data frame of the preset service in subsequent transmission. For example, in the example of FIG. 8, the first indication information may indicate that the to-be-transmitted data volume of the current data frame in the buffer of the UE is 500 bytes, and there still exists data to be transmitted in subsequent transmission.

Indication method 4: the first indication information indicates the to-be-transmitted data volume of the current data frame in the buffer of the UE and the to-be-transmitted data volume of the current data frame of the preset service in subsequent transmission. For example, in the example of FIG. 8, the first indication information may indicate that the to-be-transmitted data volume of the current data frame in the buffer of the UE is 500 bytes, and there still exist 2000 bytes of data that have not arrived at the buffer.

Assuming that the upstream radio resources obtained by the UE can transmit 1500 bytes of data of the preset service in the buffer, the first indication information contained in the first BSR generated by the UE may include one or more of the following two indication methods.

Indication method 1: the first indication information indicates the to-be-transmitted data volume of the current data frame in the buffer of the UE and whether there exists any to-be-transmitted data of the current data frame of the preset service in subsequent transmission. For example, the first indication information may indicate that the to-be-transmitted data volume of the current data frame in the buffer of the UE is 0, and there still exists data to be transmitted in subsequent transmission. Or in other words, the first indication information may indicate that there currently exists no data of the current data frame of the preset service in the buffer of the UE, but there still exists data of the current data frame in subsequent transmission.

Indication method 2: the first indication information indicates the to-be-transmitted data volume of the current data frame in the buffer of the UE and the to-be-transmitted data volume of the current data frame of the preset service in subsequent transmission. For example, the first indication information may indicate that the to-be-transmitted data volume of the current data frame in the buffer of the UE is 0, and there still exist 2000 bytes of data that have not arrived at the buffer. Or in other words, the first indication information may indicate that there currently exists no data of the current data frame of the preset service in the buffer of the UE, but there still exist 2000 bytes of data of the current data frame that have not arrived at the buffer.

Referring further to FIG. 8, in some embodiments, if the UE knows the time when the to-be-transmitted data (such as the subsequent 2000 bytes of data) of the current data frame of the preset service arrives at the UE access layer in subsequent transmission, it can also notify the network device of this information through the first indication information. In some embodiments, the first indication information may indicate the time when the first data packet arrives at the UE access layer in subsequent transmission, such as the time T_D in FIG. 8. In some embodiments, the first indication information may indicate the time when the last data packet of the current data frame arrives at the UE access layer, such as the time T_G in FIG. 8. In some embodiments, the first indication information may indicate an intermediate time, such as the time when half of the data volume arrives at the UE access layer in subsequent transmission, such as the time T_E in FIG. 8.

In some embodiments, if the first indication information includes the to-be-transmitted data volume of the current data frame of the preset service in subsequent transmission, the first BSR is not triggered when the to-be-transmitted data corresponding to the first indication information arrives at the UE access layer in subsequent transmission, or in other words, the first BSR is canceled.

In some embodiments, if additional data arrives, in addition to the data volume of the preset service in subsequent transmission already reported in the first indication information, the first BSR needs to be triggered again.

In some embodiments, if the data of the preset service in subsequent transmission reported in the first indication information changes (such as being deleted), the first BSR needs to be triggered again.

In some embodiments, if the UE only reports the status of data of the current preset service (such as the to-be-transmitted data volume of the current service frame of the preset service in the buffer) in the first indication information when reporting the first BSR, and does not report the status of data of the preset service in subsequent transmission, the first BSR needs to be triggered again when new (unreported) data of the preset service arrives in subsequent transmission.

That is to say, in some embodiments, if the UE triggers and reports the first BSR, there are two implementation methods for whether to cancel the first BSR in subsequent transmission. These two implementation methods are introduced in the following.

Implementation Method 1: Canceling the First BSR if the UE only reports the current status of data in the buffer (the current status of data of the preset service in the buffer) when reporting the first BSR, and does not report the status of data arriving at the buffer of the UE in subsequent transmission (the status of data of the preset service arriving at the buffer of the UE in subsequent transmission), the first BSR needs to be triggered again after the UE cancels the first BSR when new (unreported) data of the preset service arrives in subsequent transmission.

If the UE reports all the data volume of the current data frame of the preset service when reporting the first BSR, including the current status of data in the buffer of the UE (the current status of data of the preset service in the buffer), as well as the status of data arriving at the buffer of the UE in subsequent transmission (the status of data of the preset service arriving at the buffer of the UE in subsequent transmission), the first BSR is not triggered when the data that has already been reported arrives in subsequent transmission.

In some embodiments, in addition to the already reported data in subsequent transmission, the UE also needs to trigger the first BSR again if additional data arrives.

In some embodiments, for the already reported data in subsequent transmission, the UE also needs to trigger the first BSR again if there are changes (such as deletion) to these already reported data in subsequent transmission.

Implementation Method 2: Not Canceling the First BSR

If the UE knows that there still exists some data of the current data frame of the preset service that has not been reported when reporting the first BSR, the UE does not cancel the first BSR. In some embodiments, the UE may not cancel the first BSR until all the data of the current data frame of the preset service has been reported in the first BSR or all the data of the current data frame of the preset service has been transmitted. In some embodiments, all the data of the current data frame of the preset service having already been reported in the first BSR may refer to that the specific volume of all the data of the current data frame of the preset service has been reported in the first BSR, for example, reporting that "there still exist 2000 bytes of data of the current data frame of the preset service to be transmitted in subsequent transmission". If no specific volume of all the data of the current data frame of the preset service is reported in the first BSR, such as only reporting "there still exists data of the current data frame of the preset service to be transmitted in subsequent transmission", the first BSR is not canceled.

In some embodiments, the first BSR is triggered before the first data packet of the preset service arrives at the UE access layer, in order to further reduce the transmission latency of the preset service. For example, for one data frame of the preset service, if the UE already knows the status of data of the data frame before the first data packet of the data frame arrives at the UE access layer, the UE can trigger the first BSR before the first data packet of the data frame arrives at the UE access layer.

In some embodiments, the UE knowing in advance the status of data of the data frame of the preset service may include one or more of the total size of the data frame, the time of arrival at the UE access layer, and the like.

In some embodiments, if the first BSR is triggered before the first data packet of the preset service arrives at the UE access layer, the UE can generate and report the first BSR using upstream radio resources (upstream radio resources used for transmitting data of other services).

In some embodiments, if the UE learns that the data volume of the preset service has changed after reporting the first BSR, the UE needs to trigger BSR again. For example, when the UE reports BSR for the first time, telling the base station that there exist 2000 bytes of data to be transmitted, but later discovers that there exist only 1400 bytes of data to be transmitted, the UE triggers BSR again.

The embodiments of the present application impose no limitation on how the BSR triggered again by the UE indicates when there is a change in the data volume of the preset service. For example, the BSR triggered again by the UE can indicate the to-be-transmitted data volume that actually arrives in subsequent transmission. For example, if there exist only 1400 bytes of data to be transmitted in subsequent transmission, the UE directly indicates the 1400 bytes. Alternatively, the BSR triggered again by the UE can indicate the difference between the to-be-transmitted data volume that actually arrives in subsequent transmission and the to-be-transmitted data volume indicated by the previous first BSR. For example, when the first BSR tells the base station that there exist 2000 bytes of data to be transmitted, but later discovers that there exist only 1400 bytes of data to be transmitted, the BSR triggered again by the UE may indicate-600 bytes, indicating a decrease of 600 bytes compared to the data volume reported by the previous first BSR.

In some embodiments, if the first BSR is triggered before the first data packet of the preset service arrives at the UE access layer, the first BSR may include relevant information about the data frame of the preset service, such as one or more of the following information: the size of the data frame of the preset service, the number of data packets contained in the data frame of the preset service, and the arrival time of the data frame of the preset service (such as the time it arrives at the UE access layer). For example, for one data frame of the preset service, the UE triggers the first BSR before the first data packet of the data frame arrives at the UE. The corresponding first BSR may include the size of the data frame, the number of data packets contained in the data frame, the time when a certain data packet (such as the first data packet, the last data packet, etc.) of the data frame arrives at the UE access layer, and so on.

If the UE knows the status of the current data frame in advance, it can optimize the reporting information, that is, the UE can notify the network device of the status of the current data frame in advance, so that the network device can prepare in advance. In addition, if the network device can know in advance the status of data of the current data frame (such as the total data volume), the UE does not need to indicate to the network device that the transmission of the data frame has been finished when the data transmission of the current data frame is finished. The network device can calculate the received data volume by itself, and thus infer whether the transmission of the current data frame has been finished, saving signaling.

In related technologies, when UE reports its data caching situation through BSR, the meaning of the data volume represented by the respective reported BSR is not clear, which may lead to resource waste. Such situation is introduced below in conjunction with FIG. 9 and FIG. 10.

Figure 9:
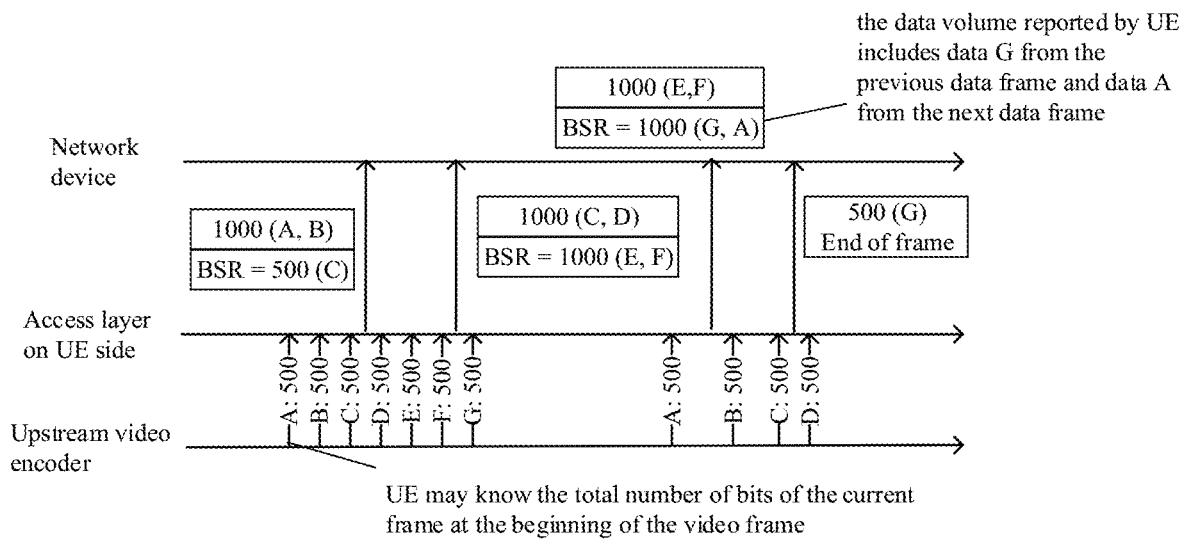
FIG. 9 is another schematic diagram of the data transmission process.

As shown in FIG. 9, the third time when the UE transmits data, it transmits data packets E and F. At this time, the buffer of the UE still contains the data packet G of the previous data frame and the data packet A of the next data frame. If the UE does not report in BSR that "data packet A is the data of the next data frame", the network device may urgently schedule data packet A, causing resource waste.

Figure 10:
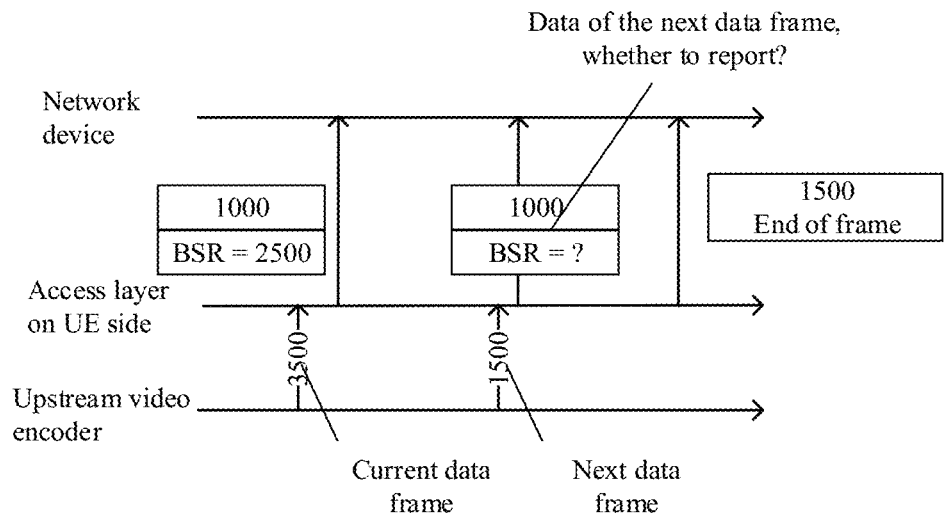
FIG. 10 is yet another schematic diagram of the data transmission process.

As shown in FIG. 10, if the data of the same data frame arrives at the UE access layer at the same time, the data of the next data frame has already arrived at the UE access layer when the UE transmits the data of that data frame. In this case, if the UE does not report in BSR that the subsequent data packet is the data of the next data frame, the network device may urgently schedule the data of the next data frame, causing resource waste.

Figure 11:
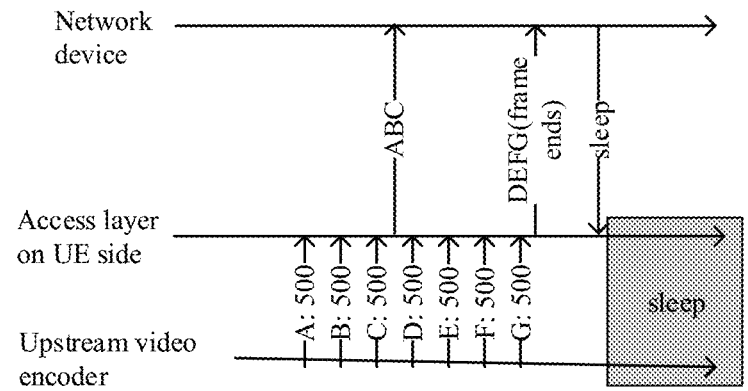
FIG. 11 is a schematic diagram of an implementation method for instructing UE to enter a power-saving state.

In order to solve the above issues, as a possible implementation, the UE can indicate to the network device that "the transmission of the data frame has ended" after completing the data transmission of one data frame of the preset service, so that the network device can notify the UE to enter a sleep state (power-saving state) according to this indication to save power. As shown in FIG. 11, one data frame of the preset service includes 7 data packets, namely A, B, C, D, E, F, and G. When the UE finishes the transmission of data packet G, it can indicate to the network device that "the transmission of the data frame has ended". The network device can send a sleep notification to the UE according to the indication sent by the UE, and the UE enters the sleep state after receiving the sleep notification. However, the power-saving performance of the above method is not desirable.

In response to this issue, the embodiments of the present application provide a solution that enables the UE to indicate in advance to the network device when the transmission of the current data frame is finished before the transmission of the current data frame is finished, thereby achieving better power-saving performance. The solution provided by the present application is introduced in the following.

Figure 12:
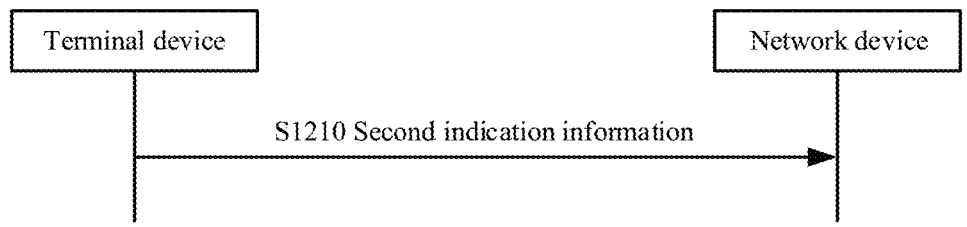
FIG. 12 is a flowchart of a method for instructing UE to enter a power-saving state provided in the embodiments of the present application.

FIG. 12 is a flowchart of a method for instructing UE to enter a power-saving state provided in the embodiments of the present application. As shown in FIG. 12, the method may include step S1210, in which the terminal device sends a second indication information to the network device.

In this embodiment of the present application, the second indication information is sent before the last data packet of the first data frame is sent. For example, if the first data frame includes 7 data packets, namely A, B, C, D, E, F, and G, and data packet G is the last data packet of the first data frame, then the second indication information is sent before transmitting data packet G. For example, the second indication information is sent when sending the first data packet (data packet A), it may also be sent when sending a certain intermediate data packet (such as data packet B, data packet D, etc.), or it may be sent before sending the first data packet (data packet A).

The first data frame may be any data frame in the preset service. For example, the first data frame may refer to the current data frame of the preset service, or it may refer to a certain data frame of the preset service to be transmitted in subsequent transmission.

The second indication information may be used for indicating the end time of the first data frame of the preset service.

Figure 13:
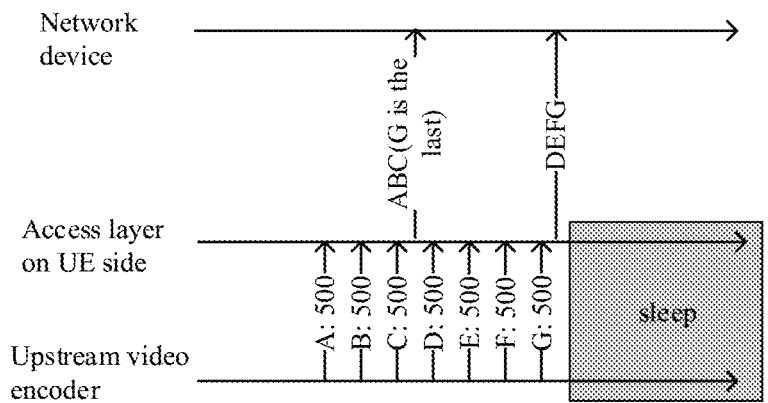
FIG. 13 is a schematic diagram of an implementation method for instructing UE to enter a power-saving state provided in the embodiments of the present application.

In some embodiments, the second indication information may indicate the end time of the first data frame by indicating a bit position at which the first data frame ends. As shown in FIG. 13, the first data frame includes 7 data packets, namely A, B, C, D, E, F, and G. The UE can indicate to the network device the bit position at which the first data frame ends (such as data packet G). After the transmission of data packet G ends, there is no need for the network device to send a sleep notification to the UE, and the UE can enter a power-saving state on its own. Compared with the technical solution in FIG. 11, this solution can improve the power-saving performance of the UE.

The embodiments of the present application impose no specific limitation on the indication method of the second indication information. In some embodiments, the second indication information may directly indicate (explicitly indicate) the end time of the first data frame. In some embodiments, the second indication information may indirectly indicate (implicitly indicate) the end time of the first data frame.

For example, the second indication information may include one or more of the following types of information: the sequence number (SN) of the last data packet of the first data frame; and the total data volume of the first data frame and the sequence number of the first data packet of the first data frame.

For example, the UE may indicate to the network device the SN of the last data packet of the first data frame, such as the packet data convergence protocol (PDCP) SN, radio link control (RLC) SN, etc.

For another example, the UE may implicitly indicate the end time of the first data frame when reporting the first BSR. For example, when reporting the first BSR, the UE implicitly indicates the to-be-transmitted data volume of the first data frame. Taking the first data frame being the current data frame of the preset service as an example, the UE may indicate that "there are still 2000 bytes of data of the current data frame to be transmitted". So, when the 2000 bytes of data are transmitted in subsequent transmission, the UE can automatically enter a power-saving state without waiting for the sleep notification sent by the network device.

Figure 14:
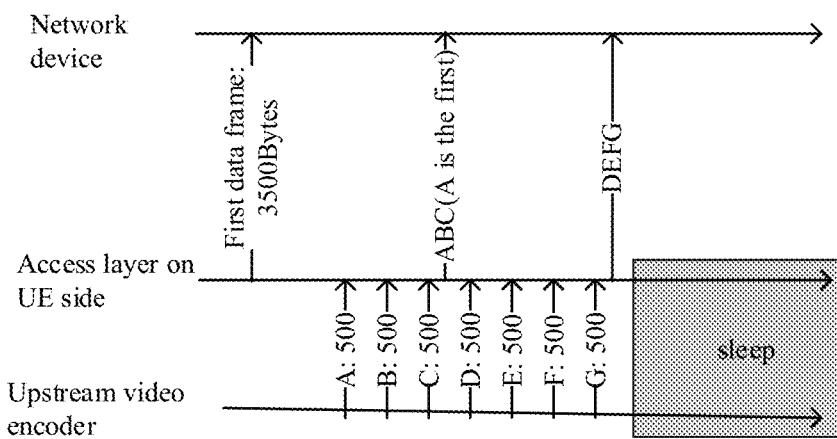
FIG. 14 is a schematic diagram of an implementation method for instructing UE to enter a power-saving state provided in another embodiment of the present application.

For another example, the UE may send the second indication information before transmitting the first data frame. As an implementation method, the UE may indicate the total data volume of the first data frame and the first data packet of the first data frame to the network device, so that the network device can determine the last data packet of the first data frame. For example, the UE may indicate the total data volume of the first data frame and the SN of the first data packet of the first data frame to the network device through the first BSR. Referring to FIG. 14, it shows an example of the UE sending the second indication information before transmitting the first data frame. In the example of FIG. 14, the UE can indicate the total data volume of the first data frame to the network device before transmitting the first data frame, and indicate the first data packet of the first data frame to the network device after starting to transmit the data of the first data frame (before transmitting the last data packet). However, the embodiments of the present application are not limited thereto. For example, both the total data volume of the first data frame and the first data packet of the first data frame may be indicated to the network device before starting to transmit the first data frame.

The embodiments of the present application impose no limitation on the implementation method of indicating SN of the data packet (such as the last data packet and the first data packet). For example, it may be indicated by PDCP control protocol data unit (PDCP control PDU), indicated in PDCP packet header, indicated by RLC control PDU, indicated in RLC packet header, indicated by MAC CE, or indicated in MAC subheader.

It should be understood that if the UE indicates to the network device at the end of the transmission of the last data packet of the first data frame (such as the current data frame) that "the transmission of the first data frame has been finished", for example, by indicating BSR=0, this indication method only indicates that there is no data of the current data frame to be transmitted, and does not indicate that there is no data of subsequent data frame to be transmitted. In fact, some or all of the data packets of the next data frame may already exist in the buffer of the UE at this time, but transmission therefor has not yet begun. The indication method in related technologies may cause BSR triggered by other data to be canceled. In contrast, using the indication method of the embodiments of the present application does not result in the cancellation of BSR triggered by other data.

In some embodiments, after the UE applies for resources to transmit the preset service, there may be remaining resources in the resources for carrying the preset service. For example, if the UE prepares the upstream transport block, there is still remaining space after all the data packets of one data frame of the preset service have been placed in the transport block (TB). As a possible implementation, the UE may determine the data packets of other services based on logical channel prioritization (LCP) and place them into TB for transmission. However, if the UE enters a power-saving state after the transmission of data of the preset service is finished, it means that the UE does not transmit upstream data for a period of time. In this case, if the data packets of other services that have already been placed into TB for transmission are segmented in the RLC of the sender (UE), there is a long time of waiting before receiving another segment after the former segment arrives at the receiver, and then these data packets are submitted to the upper layer. Therefore, there is a certain risk for the UE to transmit data of other services through the remaining resources of the preset service.

In response to the above issues, in the embodiments of the present application, as an implementation method, when there are remaining resources in the resources for carrying the preset service, the remaining resources may not be used for carrying any services, or the remaining resources may not be used for carrying other services than the preset service. As another implementation method, when there are remaining resources in the resources for carrying the preset service, the remaining resources may be used for carrying a third target service. The third target service is the service that is configured by the network device and can be carried by the remaining resources. That is to say, the network device can configure the data of which LCH that can be transmitted through the remaining resources of the preset service.

In some embodiments, when the network device configures the third target service, the configuration may be configured per flow, per LCH, or per LCG. The embodiments of the present application are not limited thereto.

In some embodiments, the network device may configure the third target service through high layer signaling (such as RRC signaling).

As mentioned earlier, 3GPP has decided to introduce a new BSR table to trigger/send BSR for preset services such as XR. So, in the embodiments of the present application, whether the UE should trigger/send the first BSR based on the old BSR table (as shown in Table 1) or based on the new BSR table is an issue that needs to be addressed.

In response to the above issue, the embodiments of the present application introduce a first mapping relationship, and the UE can determine the BSR table used to trigger/send the first BSR based on the first mapping relationship. That is to say, in some embodiments, the BSR table used when the first BSR is triggered/sent is determined based on the first mapping relationship. The technical solution provided in the embodiments of the present application is introduced in the following.

In some embodiments, the first mapping relationship may be used for indicating the BSR table corresponding to QoS flow/LCH/LCG.

In some embodiments, the first mapping relationship may be configured by the network device. For example, it may be configured by the network device through high layer signaling (such as RRC signaling). However, the embodiments of the present application are not limited thereto. For example, the first mapping relationship may also be pre-defined or pre-configured.

The embodiments of the present application impose no specific limitation on the indication method of the first mapping relationship. Several implementation methods are given below as an example in conjunction with Table 2.

Indication method 1: the first mapping relationship includes the mapping relationship between QoS flow/LCH/LCG and the BSR tables. Referring to Table 2, the BSR tables include BSR Table A and BSR Table B. The BSR Table A and the BSR Table B may respectively represent the old BSR table and the new BSR table (for example, the BSR Table A is the old BSR table, and the BSR Table B is the new BSR table; or, the BSR table A is the new BSR table and the BSR table B is the old BSR table). The indication method 1 lists the mapping relationship between different QoS flow/LCH/LCG and different BSR tables.

Indication method 2: the first mapping relationship includes the mapping relationship between QoS flow/LCH/LCG and the BSR table index. Referring to Table 2, the BSR table index includes index 0 and index 1, which may respectively represent the old BSR table and the new BSR table. Indication method 2 lists the mapping relationship between different QoS flow/LCH/LCG and different BSR table indexes.

Indication method 3: the first mapping relationship includes the mapping relationship between QoS flow/LCH/LCG and Boolean variables. The different values of the Boolean variables can be used for indicating different BSR tables. Referring to Table 2, Boolean variables include "true" and "false", which can represent the old BSR table and the new BSR table, respectively. Indication method 3 lists the mapping relationship between different QoS flow/LCH/LCG and different Boolean variables.

Indication method 4: the first mapping relationship includes the mapping relationship between QoS flow/LCH/LCG and the first parameter. The different values of the first parameter can be used for indicating different BSR tables. In some embodiments, the first parameter is an optional parameter. When the optional parameter is configured, it means that the new BSR table can be used, and when the optional parameter is not configured, it means that the old BSR table can be used. Referring to Table 2, the first parameter is represented as the "XR table", which is an optional parameter. QoS flow/LCH/LCG 1 has configured this parameter, indicating that the new BSR table can be used. QoS flow/LCH/LCG 2 and QoS flow/LCH/LCG 3 have not configured this parameter, indicating that the old BSR table can be used. However, the embodiments of the present application are not limited thereto. For example, when the first parameter is an optional parameter, if the optional parameter is configured, it may indicate that the old BSR table can be used, and if the optional parameter is not configured, it may indicate that the new BSR table can be used.

The embodiments of the present application do not limit the first parameter to be an optional parameter. For example, the first parameter may include different values (such as "XR table" and "non XR table"), indicating different BSR tables through the different values of the first parameter.

TABLE 2

| Indication method 1 | | Indication method 2 | |
| --- | --- | --- | --- |
| QoS flow/LCH/LCG 1 | BSR Table A | QoS flow/LCH/LCG 1 | Index 0 |
| QoS flow/LCH/LCG 2 | BSR Table B | QoS flow/LCH/LCG 2 | Index 1 |
| QoS flow/LCH/LCG 3 | BSR Table B | QoS flow/LCH/LCG 3 | Index 1 |
| Indication method 3 | | Indication method 4 | |
| QoS flow/LCH/LCG 1 | True | QoS flow/LCH/LCG 1 | XR Table |
| QoS flow/LCH/LCG 2 | False | QoS flow/LCH/LCG 2 | |
| QoS flow/LCH/LCG 3 | False | QoS flow/LCH/LCG 3 | |

It should be understood that the above indication methods can be used alone or in combination, and the embodiments of the present application are not limited thereto.

In some embodiments, the QoS flow/LCH/LCG configured with the new BSR table can use the new BSR table when triggering/sending the first BSR. For example, only the QoS flow/LCH/LCG configured with the new BSR table can use the new BSR table when triggering/sending the first BSR. In some embodiments, the QoS flow/LCH/LCG not configured with the new BSR table can use the old BSR table when triggering/sending the first BSR.

The embodiments of method of the present application are described in detail above with reference to FIG. 1 to FIG. 14. The embodiments of device of the present application are described in detail below with reference to FIG. 15 to FIG. 17. It should be understood that the description of the embodiments of method corresponds to the description of the embodiments of device. Therefore, the parts not described in detail can refer to the previous embodiments of method.

Figure 15:
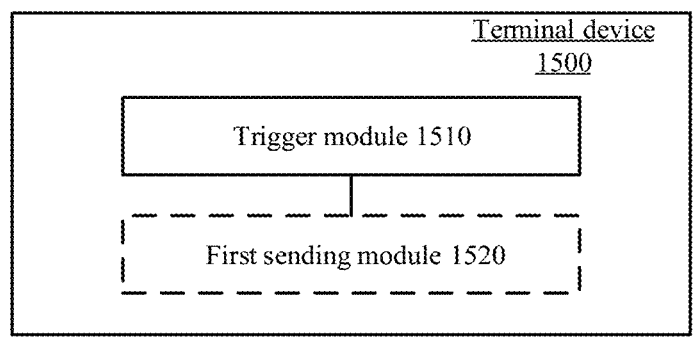
FIG. 15 is a schematic diagram of the structure of a terminal device provided in the embodiments of the present application.

FIG. 15 is a schematic diagram of the structure of a terminal device provided in the embodiments of the present application. The terminal device 1500 shown in FIG. 15 may include a trigger module 1510.

The trigger module 1510 may be configured to trigger the first BSR, where the first BSR is triggered based on a preset service.

Optionally, the triggering condition of the first BSR is associated with one or more of the following types of information: a data packet of the preset service obtained by the terminal device; transmission latency requirements of the preset service; and one or more upstream scheduling-free resources configured for the terminal device.

Optionally, the triggering condition of the first BSR includes one or more of the following: the terminal device learning that data of the preset service is about to arrive; a data packet of the preset service arriving at an access layer of the terminal device; the one or more upstream scheduling-free resources being insufficient for finishing data transmission of the preset service; and the one or more upstream scheduling-free resources being insufficient for finishing the data transmission of the preset service within a transmission pre-estimated latency of the preset service.

Optionally, the data packet of the preset service arriving at the access layer of the terminal device includes one or more of the following: a first data packet of a data frame of the preset service arriving at the access layer of the terminal device; and a data packet of the preset service arriving at the access layer of the terminal device when there exists data in quality of service (QoS) flow/logical channel/logical channel group of the terminal device not yet transmitted.

Optionally, in the case where the one or more upstream scheduling-free resources are insufficient for finishing the data transmission of the preset service, the trigger module is further configured to: trigger the first BSR when a to-be-transmitted data volume of a current data frame of the preset service exceeds remaining transmission capacity of the one or more upstream scheduling-free resources; or trigger the first BSR when the first data packet of the preset service arrives at the access layer of the terminal device.

Optionally, the terminal device further includes: a first sending module, configured to send the first BSR to the network device, wherein resources for sending the first BSR are allocated for the preset service; or, a second sending module, configured to send a second BSR to the network device, where the resources for sending the second BSR are not allocated for the preset service.

Optionally, if the resources for sending the first BSR are allocated for the preset service, the first BSR may include one or more of the following: a to-be-transmitted data volume associated with the preset service; all to-be-transmitted data volume in the buffer of the terminal device; and a to-be-transmitted data volume of a first target service, wherein the first target service is a service that is configured by the network device and is indicatable by the first BSR; if the resources for sending the second BSR are not allocated for the preset service, the second BSR comprises one or more of: a to-be-transmitted data volume of services other than the preset service in the buffer of the terminal device; all to-be-transmitted data volume in the buffer of the terminal device; and a to-be-transmitted data volume of a second target service, wherein the second target service is a service that is configured by the network device and is indicatable by the second BSR.

Optionally, if the second BSR does not include the to-be-transmitted data volume associated with the preset service, the first BSR is not canceled; or, if the second BSR includes the to-be-transmitted data volume associated with the preset service, the first BSR is canceled; or, no matter whether the second BSR includes the to-be-transmitted data volume associated with the preset service or not, the first BSR is not canceled.

Optionally, the cancellation and/or transmission of the first BSR is determined according to a first condition, where the first condition is related to the resources obtained by the terminal device for transmitting the preset service.

Optionally, the first condition includes one or more of the following: whether the resources obtained by the terminal device for transmitting the preset service are sufficient for finishing transmission of a current data frame of the preset service; whether the resources obtained by the terminal device for transmitting the preset service are sufficient for finishing transmission of all to-be-transmitted data of a current preset service in the buffer of the terminal device; whether the resources obtained by the terminal device for transmitting the preset service are sufficient for finishing transmission of to-be-transmitted data of all preset services in the buffer of the terminal device; and whether the resources obtained by the terminal device for transmitting the preset service can finish the transmission of all the to-be-transmitted data in the buffer of the terminal device.

Optionally, if the first BSR is sent, the first BSR includes one or more of the following information: a to-be-transmitted data volume of a current data frame of the preset service; a to-be-transmitted data volume of a current preset service in the buffer of the terminal device; a to-be-transmitted data volume of all preset services in the buffer of the terminal device; all to-be-transmitted data volume in the buffer of the terminal device; a total data volume of the current data frame of the preset service; and a remaining data volume, excluding a data volume that is transmittable by upstream scheduling-free resources, in the current data frame of the preset service.

Optionally, the remaining data volume, excluding the data volume that can be transmitted by the upstream scheduling-free resources, in the current data frame of the preset service may be a negative value.

Optionally, if the first BSR is sent, the first BSR includes first indication information, where the first indication information is used for indicating whether there exists any to-be-transmitted data associated with the preset service in subsequent transmission.

Optionally, the first indication information includes one or more of the following: whether there exists any to-be-transmitted data of a current data frame of the preset service in subsequent transmission; a to-be-transmitted data volume of a current data frame of the preset service; and time when the to-be-transmitted data of the current data frame of the preset service arrives at an access layer of the terminal device.

Optionally, if the first indication information includes the to-be-transmitted data volume of the current data frame of the preset service, the first BSR is not triggered when the to-be-transmitted data corresponding to the first indication information arrives at the access layer of the terminal device in subsequent transmission.

Optionally, the first BSR is triggered before the first data packet of the preset service arrives at the access layer of the terminal device.

Optionally, the first BSR includes one or more of the following types of information: a size of a data frame of the preset service, a number of data packets contained in the data frame of the preset service, and time when a data packet of the preset service arrives at the access layer of the terminal device.

Optionally, the terminal device further includes: a third sending module, configured to send second indication information to the network device, wherein the second indication information is used for indicating end time information of a first data frame of the preset service, and the second indication information is sent before a last data packet of the first data frame is sent.

Optionally, the second indication information may include one or more of the following types of information: a sequence number of the last data packet of the first data frame; a to-be-transmitted data volume of the first data frame; and a total data volume of the first data frame and a sequence number of the first data packet of the first data frame.

Optionally, the terminal device further includes: a control module, configured to control, in response to transmission of the last data packet of the first data frame being finished, the terminal device to automatically enter a power-saving state.

Optionally, when there are remaining resources in the resources for carrying the preset service, the remaining resources are not used for carrying any services; or the remaining resources are not used for carrying other services than the preset service; or the remaining resources are used for carrying a third target service, where the third target service is a service that is configured by the network device and can be carried by the remaining resources.

Optionally, the BSR table used when the first BSR is triggered is determined according to a first mapping relationship, where the first mapping relationship is used for indicating the BSR table corresponding to QoS flow/LCH/LCG.

Optionally, the first mapping relationship includes one or more of the following: a mapping relationship between the QoS flow/logical channel/logical channel group and the BSR table; a mapping relationship between the QoS flow/logical channel/logical channel group and a BSR table index; a mapping relationship between the QoS flow/logical channel/logical channel group and Boolean variables, wherein different values of the Boolean variables are used for indicating different BSR tables; and a mapping relationship between the QoS flow/LCH/LCG and a first parameter, wherein different values of the first parameter are used for indicating different BSR tables.

Optionally, the first BSR is a regular BSR.

Optionally, the characteristics of the preset service include one or more of the following: one data burst of the preset service comprising a plurality of data packets; one data frame of the preset service comprising a plurality of data packets; and the preset service being XR service.

Optionally, the trigger module 1510 may be a processor 1710. The terminal device 1500 may also include a transceiver 1730 and a memory 1720, as specifically shown in FIG. 17.

Figure 16:
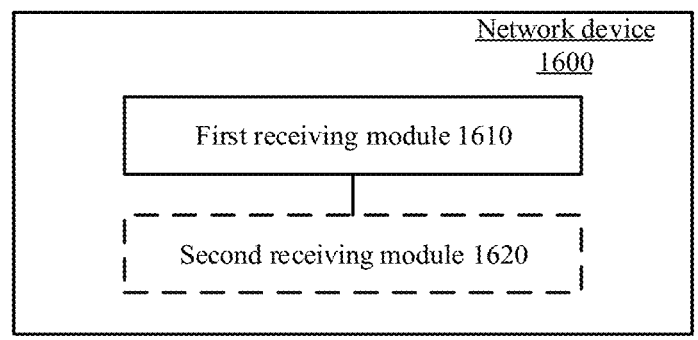
FIG. 16 is a schematic diagram of the structure of a network device provided in the embodiments of the present application.

FIG. 16 is a schematic diagram of the structure of a network device provided in the embodiments of the present application. The terminal device 1600 shown in FIG. 16 may include a first receiving module 1610.

The first receiving module 1610 is configured to receive the first BSR sent by the terminal device, where the first BSR is triggered based on the preset service.

Optionally, the triggering condition of the first BSR includes one or more of the following: the terminal device learning that data of the preset service is about to arrive; a data packet of the preset service arriving at an access layer of the terminal device; the one or more upstream scheduling-free resources being insufficient for finishing data transmission of the preset service; and the one or more upstream scheduling-free resources being insufficient for finishing the data transmission of the preset service within a transmission pre-estimated latency of the preset service.

Optionally, the data packet of the preset service arriving at the access layer of the terminal device includes one or more of the following: a first data packet of a data frame of the preset service arriving at the access layer of the terminal device; and a data packet of the preset service arriving at the access layer of the terminal device when there exists data in quality of service (QoS) flow/logical channel/logical channel group of the terminal device not yet transmitted.

Optionally, in the case where the one or more upstream scheduling-free resources are insufficient for finishing the data transmission of the preset service, the first BSR is triggered after the to-be-transmitted data volume of the current data frame of the preset service exceeds the remaining transmission capacity of the one or more upstream scheduling-free resources; or, the first BSR is triggered when a first data packet of the preset service arrives at the access layer of the terminal device.

Optionally, the network device further includes: a second receiving module, configured to receive the first BSR sent by the terminal device, wherein resources for sending the first BSR are allocated for the preset service; or, a third receiving module, configured to receive a second BSR sent by the terminal device, where the resources for sending the second BSR are not allocated for the preset service.

Optionally, if the resources for sending the first BSR are allocated for the preset service, the first BSR may include one or more of the following: a to-be-transmitted data volume associated with the preset service; all to-be-transmitted data volume in the buffer of the terminal device; and a to-be-transmitted data volume of a first target service, wherein the first target service is a service that is configured by the network device and is indicatable by the first BSR; if the resources for sending the second BSR are not allocated for the preset service, the second BSR comprises one or more of: a to-be-transmitted data volume of services other than the preset service in the buffer of the terminal device; all to-be-transmitted data volume in the buffer of the terminal device; and a to-be-transmitted data volume of a second target service, wherein the second target service is a service that is configured by the network device and is indicatable by the second BSR.

Optionally, if the second BSR does not include the to-be-transmitted data volume associated with the preset service, the first BSR is not canceled; or, if the second BSR includes the to-be-transmitted data volume associated with the preset service, the first BSR is canceled; or, no matter whether the second BSR includes the to-be-transmitted data volume associated with the preset service or not, the first BSR is not canceled.

Optionally, the cancellation and/or transmission of the first BSR is determined according to a first condition, where the first condition is related to the resources obtained by the terminal device for transmitting the preset service.

Optionally, the first condition includes one or more of the following: whether the resources obtained by the terminal device for transmitting the preset service are sufficient for finishing transmission of a current data frame of the preset service; whether the resources obtained by the terminal device for transmitting the preset service are sufficient for finishing transmission of all to-be-transmitted data of a current preset service in the buffer of the terminal device; whether the resources obtained by the terminal device for transmitting the preset service are sufficient for finishing transmission of to-be-transmitted data of all preset services in the buffer of the terminal device; and whether the resources obtained by the terminal device for transmitting the preset service can finish the transmission of all the to-be-transmitted data in the buffer of the terminal device.

Optionally, the first BSR includes one or more of the following information: a to-be-transmitted data volume of a current data frame of the preset service; a to-be-transmitted data volume of a current preset service in the buffer of the terminal device; a to-be-transmitted data volume of all preset services in the buffer of the terminal device; all to-be-transmitted data volume in the buffer of the terminal device; a total data volume of the current data frame of the preset service; and a remaining data volume, excluding a data volume that is transmittable by upstream scheduling-free resources, in the current data frame of the preset service.

Optionally, the remaining data volume, excluding the data volume that can be transmitted by the upstream scheduling-free resources, in the current data frame of the preset service may be a negative value.

Optionally, the first BSR includes first indication information, where the first indication information is used for indicating whether there exists any to-be-transmitted data associated with the preset service in subsequent transmission.

Optionally, the first indication information includes one or more of the following: whether there exists any to-be-transmitted data of a current data frame of the preset service in subsequent transmission; a to-be-transmitted data volume of a current data frame of the preset service; and time when the to-be-transmitted data of the current data frame of the preset service arrives at an access layer of the terminal device.

Optionally, if the first indication information includes the to-be-transmitted data volume of the current data frame of the preset service, the first BSR is not triggered when the to-be-transmitted data corresponding to the first indication information arrives at the access layer of the terminal device in subsequent transmission.

Optionally, the first BSR is triggered before the first data packet of the preset service arrives at the access layer of the terminal device.

Optionally, the first BSR includes one or more of the following types of information: a size of a data frame of the preset service, a number of data packets contained in the data frame of the preset service, and time when a data packet of the preset service arrives at the access layer of the terminal device.

Optionally, the network device further includes: a fourth receiving module, configured to receive second indication information sent by the terminal device, wherein the second indication information is used for indicating end time information of a first data frame of the preset service, and the second indication information is sent before a last data packet of the first data frame is sent.

Optionally, the second indication information may include one or more of the following types of information: a sequence number of the last data packet of the first data frame; a to-be-transmitted data volume of the first data frame; and a total data volume of the first data frame and a sequence number of the first data packet of the first data frame.

Optionally, the terminal device entering the power-saving state is triggered by the transmission of the last data packet of the first data frame.

Optionally, when there are remaining resources in the resources for carrying the preset service, the remaining resources are not used for carrying any services; or the remaining resources are not used for carrying other services than the preset service; or the remaining resources are used for carrying a third target service, where the third target service is a service that is configured by the network device and can be carried by the remaining resources.

Optionally, the BSR table used when the first BSR is triggered is determined according to a first mapping relationship, where the first mapping relationship is used for indicating the BSR table corresponding to QoS flow/LCH/LCG.

Optionally, the first mapping relationship includes one or more of the following: a mapping relationship between the QoS flow/logical channel/logical channel group and the BSR table; a mapping relationship between the QoS flow/logical channel/logical channel group and a BSR table index; a mapping relationship between the QoS flow/logical channel/logical channel group and Boolean variables, wherein different values of the Boolean variables are used for indicating different BSR tables; and a mapping relationship between the QoS flow/LCH/LCG and a first parameter, wherein different values of the first parameter are used for indicating different BSR tables.

Optionally, the first BSR is a regular BSR.

Optionally, the characteristics of the preset service include one or more of the following: one data burst of the preset service comprising a plurality of data packets; one data frame of the preset service comprising a plurality of data packets; and the preset service being XR service.

Optionally, the first receiving module 1610 may be a transceiver 1730. The network device 1600 may also include a processor 1710 and a memory 1720, as specifically shown in FIG. 17.

Figure 17:
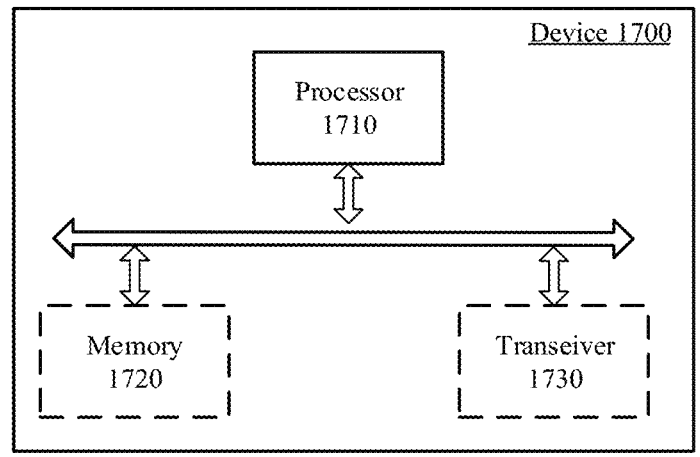
FIG. 17 is a schematic diagram of the structure of a communication device provided in the embodiments of the present application.

FIG. 17 is a schematic diagram of the structure of a communication device in the embodiments of the present application. The dashed line in FIG. 17 indicates that the unit or module is optional. The device 1700 can be configured to implement the method described in the above method embodiments. The device 1700 may be a chip, terminal device, or network device.

The device 1700 may include one or more processors 1710. The processor 1710 can support the device 1700 to implement the method described in the previous method embodiments. The processor 1710 may be a general-purpose processor or a dedicated processor. For example, the processor may be a central processing unit (CPU). Alternatively, the processor may also be other general-purpose processor, digital signal processor (DSP), application specific integrated circuits (ASIC), field programmable gate array (FPGA) or other programmable logic device, discrete gate or transistor logic device, discrete hardware component, etc. The general-purpose processor may be a microprocessor or any conventional processor.

The device 1700 may also include one or more memories 1720. The memory 1720 stores a program that can be executed by the processor 1710, enabling the processor 1710 to perform the method described in the previous method embodiments. The memory 1720 may be independent of the processor 1710 or integrated into the processor 1710.

The device 1700 may also include a transceiver 1730. The processor 1710 may communicate with other devices or chips through the transceiver 1730. For example, the processor 1710 can exchange data with other devices or chips through the transceiver 1730.

The embodiments of the present application also provide a computer-readable storage medium for storing a program. The computer-readable storage medium can be applied to the terminal or network device provided in the embodiments of the present application, and the program stored therein enables the computer to execute the method executable by the terminal or network device in the embodiments of the present application.

The embodiments of the present application also provide a computer program product. The computer program product includes a program. The computer program product can be applied to the terminal or network device provided in the embodiments of the present application, and the program included therein enables the computer to execute the method executable by the terminal or network device in the embodiments of the present application.

The embodiments of the present application also provide a computer program. The computer program can be applied to the terminal or network device provided in the embodiments of the present application, and enables the computer to execute the method executable by the terminal or network device in the embodiments of the present application.

It should be understood that the terms "system" and "network" in the present application can be used interchangeably. In addition, the terms used in the present application are only for explaining the specific embodiments of the present application, and are not intended to limit the present application. The terms "first," "second," "third," and "fourth" used in the specification, claims, and accompanying drawings of the present application are intended to distinguish different objects and not to describe a specific order. In addition, the terms "include" and "have", as well as any variations thereof, are intended to cover non-exclusive inclusions.

In the embodiments of the present application, the term "indication" may be a direct indication, an indirect indication, or a representation of an associated relationship. For example, A indicates B, which may mean that A directly indicates B. For example, B can be obtained through A; which may also mean that A indirectly indicates B, for example, A indicates C, and B can be obtained through C; which may also mean that there is a correlation between A and B.

In the embodiments of the present application, "B corresponding to A" indicates that B is associated with A, and B can be determined according to A. But it should also be understood that determining B according to A does not mean determining B solely according to A, but mean that B can be determined according to A and/or other information.

In the embodiments of the present application, the term "corresponding" may indicate a direct or indirect correspondence relationship between two objects, an association relationship between the two objects, or a relationship of indicating and being indicated, configuring and being configured.

In the embodiments of the present application, the term "include" may refer to direct or indirect inclusion. Optionally, the term "include" mentioned in the embodiments of the present application can be replaced with "indicate" or "be used for determining". For example, A includes B, which can be replaced with A indicates B, or A is used for determining B.

In the embodiments of the present application, "being pre-defined" or "being pre-configured" can be implemented by pre-storing corresponding codes or tables in devices (for example, including terminal devices and network devices) or other ways that can be used for indicating relevant information. The specific implementation method therefor is not limited in the present application. For example, being pre-defined may refer to being defined in a protocol.

In the embodiments of the present application, the term "protocol" may refer to standard protocols in the field of communication, such as LTE protocol, NR protocol, and related protocols applied in future communication systems, which is not limited in the present application.

The term "and/or" in the embodiments of the present application only describes the association relationship between related objects, indicating that there may exist three types of relationships. For example, A and/or B may cover the following three situations: A exists alone, A and B exist simultaneously, and B exists alone. In addition, the character "/" in this paper generally indicates that the related objects before and after the "/" are in an "or" relationship.

In the embodiments of the present application, the sequence numbers of the above processes do not imply the order of execution and should not constitute any limitation on the implementation process of the embodiments of the present application. The order of execution of each process should be determined by its function and internal logic.

In the several embodiments provided in the present application, it should be understood that the disclosed systems, devices, and methods can be implemented in other ways. For example, the device embodiments described above are only illustrative. For example, the division of units is only a division in accordance with logical function. In practical implementation, there may be other division methods. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, which can be electrical, mechanical or in other forms.

The units described as separate components may or may not be physically separated, and the components shown as units may or may not be physical units, i.e., these components may be located in one place or distributed across multiple network units. Some or all of the units can be selected according to actual needs to achieve the purpose of the embodiments.

In addition, the functional units in various embodiments of the present application may be integrated into one processing unit, may physically exist separately, or, two or more of the functional units may be integrated into one unit.

In the above embodiments, the functional units can be fully or partially implemented through software, hardware, firmware, or any combination thereof. When implemented using software, the units can be fully or partially implemented in the form of a computer program product. The computer program product includes one or more computer instructions. When loading and executing the computer program instructions in a computer, all or part of the processes or functions described in the embodiments of the present application are generated. The computer may be a general-purpose computer, a dedicated computer, a computer network, or other programmable device. The computer instructions may be stored in a computer-readable storage medium or transmitted from one computer-readable storage medium to another. For example, the computer instructions may be transmitted from a website site, computer, server, or data center to another website site, computer, server, or data center via wired (such as coaxial cable, fiber optic, digital subscriber line (DSL)) or wireless (such as infrared, wireless, microwave, etc.) means. The computer-readable storage medium can be any available medium that a computer can read, or a data storage device such as a server or data center that integrates one or more available media. The available medium may be magnetic medium (such as floppy disk, hard disk, magnetic tape), optical medium (such as digital video disc (DVD)), or semiconductor medium (such as solid state disk (SSD)).

The above only describes specific implementation of the present application, but the scope of protection of the present application is not limited thereto. Any skilled person familiar with the technical field can easily conceive changes or replacements within the technical scope disclosed by the present application. These changes or replacements should be covered in the scope of protection of the present application. Therefore, the scope of protection of the present application shall be subject to the scope of protection of the appended claims.

What is claimed is:

1. A method for transmitting a buffer state report (BSR), comprising:
   triggering a first BSR by a terminal device, wherein the first BSR is triggered based on a preset service; and
   sending the first BSR, wherein the first BSR comprises first indication information, wherein the first indication information indicates whether there exists any to-be-transmitted data associated with the preset service in subsequent transmission, and wherein the first indication information comprises one or more of:
      indicator indicating whether there exists any to-be-transmitted data of a current data frame of the preset service in subsequent transmission;
      a to-be-transmitted data volume of a current data frame of the preset service; or
      information indicating time when the to-be-transmitted data of the current data frame of the preset service arrives at an access layer of the terminal device.

2. The method according to claim 1, wherein a triggering condition of the first BSR is associated with one or more of:
   a data packet of the preset service obtained by the terminal device;
   transmission latency requirements of the preset service; or
   one or more upstream scheduling-free resources configured for the terminal device.

3. The method according to claim 2, wherein the triggering condition of the first BSR comprises one or more of:
   the terminal device learning that data of the preset service is about to arrive;
   a data packet of the preset service arriving at an access layer of the terminal device;
   the one or more upstream scheduling-free resources being insufficient for finishing data transmission of the preset service;
   the one or more upstream scheduling-free resources being sufficient for finishing data transmission of the preset service;
   the one or more upstream scheduling-free resources being insufficient for finishing data transmission of the preset service within a transmission pre-estimated latency of the preset service; or
   the one or more upstream scheduling-free resources being sufficient for finishing data transmission of the preset service within a transmission pre-estimated latency of the preset service.

4. The method according to claim 3, wherein the data packet of the preset service arriving at the access layer of the terminal device comprises one or more of:
   a first data packet of a data frame of the preset service arriving at the access layer of the terminal device; or
   a data packet of the preset service arriving at the access layer of the terminal device when there exists data in a quality of service (QoS) flow or a logical channel or a logical channel group of the terminal device not yet transmitted.

5. The method according to claim 3, wherein in a case where the one or more upstream scheduling-free resources are insufficient for finishing the data transmission of the preset service, triggering the first BSR comprises:
   triggering the first BSR after a to-be-transmitted data volume of a current data frame of the preset service exceeds a remaining transmission capacity of the one or more upstream scheduling-free resources; or
   triggering the first BSR when a first data packet of the preset service arrives at the access layer of the terminal device.

6. The method according to claim 1, wherein resources for sending the first BSR are allocated for the preset service; or
   resources for sending the first BSR are not allocated for the preset service.

7. The method according to claim 6, wherein
   if the resources for sending the first BSR are allocated for the preset service, the first BSR comprises one or more of: a to-be-transmitted data volume associated with the preset service; all to-be-transmitted data volume in a buffer of the terminal device; or a to-be-transmitted data volume of a first target service, wherein the first target service is a service that is configured by a network device and is indicatable by the first BSR; or
   if the resources for sending the first BSR are not allocated for the preset service, the first BSR comprises one or more of: a to-be-transmitted data volume of services other than the preset service in the buffer of the terminal device; all to-be-transmitted data volume in the buffer of the terminal device; or a to-be-transmitted data volume of a second target service, wherein the second target service is a service that is configured by the network device and is indicatable by the first BSR.

8. The method according to claim 1, wherein cancellation or transmission of the first BSR is determined according to a first condition, wherein the first condition is related to resources obtained by the terminal device for transmitting the preset service.

9. The method according to claim 8, wherein the first condition comprises one or more of:
   whether the resources obtained by the terminal device for transmitting the preset service are sufficient for finishing transmission of a current data frame of the preset service;
   whether the resources obtained by the terminal device for transmitting the preset service are sufficient for finishing transmission of all to-be-transmitted data of a current preset service in a buffer of the terminal device;
   whether the resources obtained by the terminal device for transmitting the preset service are sufficient for finishing transmission of to-be-transmitted data of all preset services in the buffer of the terminal device; or
   whether the resources obtained by the terminal device for transmitting the preset service are sufficient for finishing transmission of all to-be-transmitted data in the buffer of the terminal device.

10. The method according to claim 1, wherein the first BSR comprises one or more of:
    a to-be-transmitted data volume of a current data frame of the preset service;
    a to-be-transmitted data volume of a current preset service in a buffer of the terminal device;
    a to-be-transmitted data volume of all preset services in the buffer of the terminal device;

all to-be-transmitted data volume in the buffer of the terminal device;
a total data volume of the current data frame of the preset service; or
a remaining data volume, excluding a data volume that is transmittable by upstream scheduling-free resources, in the current data frame of the preset service.

11. The method according to claim 10, wherein the remaining data volume, excluding the data volume that is transmittable by upstream scheduling-free resources, in the current data frame of the preset service is a negative value.

12. The method according to claim 1, wherein if the first indication information comprises the to-be-transmitted data volume of the current data frame of the preset service, refraining from triggering a BSR when the to-be-transmitted data corresponding to the first indication information arrives at an access layer of the terminal device in subsequent transmission.

13. The method according to claim 1, wherein the first BSR is sent by using a BSR table, wherein the BSR table is determined based on a first mapping relationship, wherein the first mapping relationship is received from a network device through radio resource control (RRC) signaling.

14. The method according to claim 13, wherein the first mapping relationship comprises one or more of:
a mapping relationship between different BSR tables and corresponding at least one of a QoS flow, a logical channel, or a logical channel group;
a mapping relationship between different BSR table indices and corresponding at least one of a QoS flow, a logical channel, or a logical channel group;
a mapping relationship between different Boolean variables and corresponding at least one of a QoS flow, a logical channel, or a logical channel group; or
a mapping relationship between different values of a first parameter and corresponding at least one of a QoS flow, a logical channel, or a logical channel group.

15. The method according to claim 1, wherein the first BSR is a regular BSR.

16. A method for transmitting a buffer state report (BSR), comprising:
receiving, by a network device, a first BSR sent by a terminal device, wherein the first BSR is triggered based on a preset service, and wherein the first BSR comprises first indication information, wherein the first indication information indicates whether there exists any to-be-transmitted data associated with the preset service in subsequent transmission, and wherein the first indication information comprises one or more of:
indicator indicating whether there exists any to-be-transmitted data of a current data frame of the preset service in subsequent transmission;
a to-be-transmitted data volume of a current data frame of the preset service; or
information indicating time when the to-be-transmitted data of the current data frame of the preset service arrives at an access layer of the terminal device.

17. A terminal device, comprising:
at least one processor; and
one or more non-transitory computer-readable storage media coupled to the at least one processor and storing programming instructions for execution by the at least one processor, wherein the programming instructions, when executed, cause the terminal device to perform operations comprising:
triggering a first BSR, wherein the first BSR is triggered based on a preset service; and
sending the first BSR, wherein the first BSR comprises first indication information, wherein the first indication information indicates whether there exists any to-be-transmitted data associated with the preset service in subsequent transmission, and wherein the first indication information comprises one or more of:
indicator indicating whether there exists any to-be-transmitted data of a current data frame of the preset service in subsequent transmission;
a to-be-transmitted data volume of a current data frame of the preset service; or
information indicating time when the to-be-transmitted data of the current data frame of the preset service arrives at an access layer of the terminal device.

18. The terminal device according to claim 17, wherein a triggering condition of the first BSR is associated with one or more of:
a data packet of the preset service obtained by the terminal device;
transmission latency requirements of the preset service; or
one or more upstream scheduling-free resources configured for the terminal device.

19. The terminal device according to claim 18, wherein the triggering condition of the first BSR comprises one or more of:
the terminal device learning that data of the preset service is about to arrive;
a data packet of the preset service arriving at an access layer of the terminal device;
the one or more upstream scheduling-free resources being insufficient for finishing data transmission of the preset service;
the one or more upstream scheduling-free resources being sufficient for finishing data transmission of the preset service;
the one or more upstream scheduling-free resources being insufficient for finishing data transmission of the preset service within a transmission pre-estimated latency of the preset service; or
the one or more upstream scheduling-free resources being sufficient for finishing data transmission of the preset service within a transmission pre-estimated latency of the preset service.

20. The terminal device according to claim 19, wherein the data packet of the preset service arriving at the access layer of the terminal device comprises one or more of:
a first data packet of a data frame of the preset service arriving at the access layer of the terminal device; or
a data packet of the preset service arriving at the access layer of the terminal device when there exists data in a quality of service (QoS) flow or a logical channel or a logical channel group of the terminal device not yet transmitted.

* * * * *